(12) United States Patent
Tsuchida

(10) Patent No.: US 10,563,063 B2
(45) Date of Patent: Feb. 18, 2020

(54) RELEASE AGENT COMPOSITION FOR SILICONE ADHESIVE, RELEASE FILM, AND LAMINATE

(71) Applicant: SHIN-ETSU CHEMICAL CO., LTD., Tokyo (JP)

(72) Inventor: Osamu Tsuchida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 133 days.

(21) Appl. No.: 15/558,513

(22) PCT Filed: Mar. 24, 2016

(86) PCT No.: PCT/JP2016/059446
§ 371 (c)(1),
(2) Date: Sep. 14, 2017

(87) PCT Pub. No.: WO2016/152992
PCT Pub. Date: Sep. 29, 2016

(65) Prior Publication Data
US 2018/0086915 A1    Mar. 29, 2018

(30) Foreign Application Priority Data

Mar. 26, 2015 (JP) ................................ 2015-064876
Mar. 26, 2015 (JP) ................................ 2015-064906

(51) Int. Cl.
*C08L 83/04* (2006.01)
*B01J 23/40* (2006.01)
*C09J 11/04* (2006.01)
*C09J 183/00* (2006.01)

(52) U.S. Cl.
CPC ............... *C08L 83/04* (2013.01); *B01J 23/40* (2013.01); *C09J 11/04* (2013.01); *C09J 183/00* (2013.01)

(58) Field of Classification Search
CPC ........... C08L 83/04; C09J 11/04; C09J 183/00
See application file for complete search history.

(56) References Cited

U.S. PATENT DOCUMENTS

| | | | |
|---|---|---|---|
| 4,889,753 A | 12/1989 | Brown et al. | |
| 4,980,443 A * | 12/1990 | Kendziorski | C08G 77/24 528/31 |
| 5,082,706 A * | 1/1992 | Tangney | C09D 183/08 428/40.7 |
| 5,300,670 A * | 4/1994 | Kobayashi | C08G 77/24 528/15 |
| 5,356,719 A * | 10/1994 | Hamada | C08L 83/08 428/447 |
| 5,578,381 A | 11/1996 | Hamada et al. | |
| 5,696,211 A * | 12/1997 | Chung | C09D 183/04 525/478 |
| 2008/0311333 A1 | 12/2008 | Yoon et al. | |
| 2011/0251339 A1 | 10/2011 | Yamaguchi et al. | |
| 2012/0219794 A1 * | 8/2012 | Seth | C08L 83/08 428/352 |
| 2014/0010963 A1 | 1/2014 | Brasseur et al. | |

FOREIGN PATENT DOCUMENTS

| | | |
|---|---|---|
| EP | 0 576 984 A2 | 1/1994 |
| EP | 0 608 780 A2 | 8/1994 |
| JP | 5-7434 A | 1/1993 |
| JP | 6-16941 A | 1/1994 |
| JP | 6-279681 A | 10/1994 |
| JP | 7-51699 A | 2/1995 |
| JP | 8-73809 A | 3/1996 |
| JP | 2513026 B2 | 7/1996 |
| JP | 9-176491 A | 7/1997 |
| JP | 11-60953 A | 3/1999 |
| JP | 11-156105 A | 6/1999 |
| JP | 3024445 B2 | 3/2000 |
| JP | 2005-29712 A | 2/2005 |
| JP | 2009-518499 A | 5/2009 |
| JP | 2009-154457 A | 7/2009 |
| JP | 2010-180347 A | 8/2010 |
| JP | 4524549 B2 | 8/2010 |
| JP | 2012-246359 A | 12/2012 |
| JP | 2013-510921 A | 3/2013 |
| JP | 2013-173944 A | 9/2013 |
| JP | 5343911 B2 | 11/2013 |
| JP | 5553395 B2 | 7/2014 |

OTHER PUBLICATIONS

International Search Report for PCT/JP2016/059446 (PCT/ISA/210) dated Jun. 21, 2016.
Written Opinion of the International Searching Authority for PCT/JP2016/059446 (PCT/ISA/237) dated Jun. 21, 2016.
Extended European Search Report dated Oct. 11, 2018, in European Patent Application No. 16768895.1.

* cited by examiner

*Primary Examiner* — Margaret G Moore
(74) *Attorney, Agent, or Firm* — Birch, Stewart, Kolasch & Birch, LLP

(57) ABSTRACT

Provided is a release agent composition for silicone adhesives in which organopolysiloxane having a specific structure is added, as a heavy release component, to a release agent composition for silicone adhesives that includes organopolysiloxane modified with a fluorine-containing organic group.

12 Claims, No Drawings

RELEASE AGENT COMPOSITION FOR SILICONE ADHESIVE, RELEASE FILM, AND LAMINATE

TECHNICAL FIELD

This invention relates to a release agent composition for silicone pressure-sensitive adhesives capable of providing a release agent having a high release force, a release liner obtained by treating a plastic film with the composition, and a laminate.

BACKGROUND ART

Pressure-sensitive adhesives (PSAs) constitute one group of adhesives and are often used in the form of PSA tape, PSA label or the like obtained by coating PSA onto a substrate and curing. Such tapes and labels are typical of PSA articles familiar in everyday life. These articles are used as labels for identification, for packing of things, for binding a plurality of parts, and in many other applications.

Several base materials are known for PSAs and generally classified into rubber, acrylic, and silicone bases. Rubber base PSAs are general-purpose base materials which are known from the past, and frequently used as general-purpose tape and other products because of low price. Acrylic base PSAs are based on polyacrylates and have better chemical properties than the rubber base PSAs, and are applicable to higher performance PSA products. Silicone base PSAs are composed of high viscosity silicone gum and silicone resin wherein the backbone is formed of siloxane bonds. Thus the silicone PSAs have a variety of excellent characteristics such as heat resistance, freeze resistance, weather resistance, chemical resistance and electric insulation.

By virtue of such excellent characteristics, the silicone PSAs are used as industrial high-performance tapes such as heat resistant tape, masking tape for processing, and flame retardant mica tape. They are often used in a rigorous environment since they exert their own characteristics even under severe service conditions.

Further, since the silicone PSAs are fully adhesive to surfaces coated with silicone rubber and silicone base materials, they are also utilized for tying silicone-treated release liners. However, the silicone base PSAs cannot be smoothly peeled from those release liners used with the acrylic and rubber base PSAs.

Under the circumstances, release agents based on fluorinated materials are used. Patent Document 1 (JP 2513026) describes a release agent based on a polymer obtained from copolymerization of a fluorinated vinyl monomer and a silicon-containing vinyl monomer. Patent Documents 2 to 6 (JP-B H05-007434, JP-B H07-051699, JP 3024445, JP 4524549, and JP 5343911) refer to release agents based on an organopolysiloxane modified with a fluorinated organic group, and describe that a cured coating obtained from hydrosilylation is formed on a substrate, which is used as a release liner. In Patent Document 6, the composition is a solventless system.

In the inventions cited above, an adhesive substrate obtained by coating and curing silicone PSA to a substrate can be readily peeled, and the silicone PSA maintains good adhesiveness even after peeling. When it is desired to adjust the release force, the release force may be altered by controlling the fluorine content of the base polymer or by changing the type of fluorinated organic group. For example, when the silicone PSA is used without a substrate, PSA on its opposed surfaces is sandwiched between releasable cured coatings and one side coating is peeled off. At this point, there must be a difference in release force between the opposed surfaces. To this end, a release agent with a low release force and a release agent with a high release force must be used.

The release force may be increased by reducing the fluorine content of the release agent, but there are no reports of increasing the release force by other means. One approach that can be contemplated is by adding an additional component to the release agent to increase the release force. If this approach is possible, there is no need to furnish two release agents having different fluorine contents in order to form cured coatings with different release forces.

PRIOR ART DOCUMENTS

Patent Documents

Patent Document 1: JP 2513026
Patent Document 2: JP-B H05-007434
Patent Document 3: JP-B H07-051699
Patent Document 4: JP 3024445
Patent Document 5: JP 4524549
Patent Document 6: JP 5343911
Patent Document 7: JP-A 2005-029712
Patent Document 8: JP 5553395

SUMMARY OF THE INVENTION

Problems to be Solved by the Invention

An object of the invention, which has been made under the above-mentioned circumstances, is to provide a release agent composition for silicone pressure-sensitive adhesives having a controlled release force, and a release liner obtained by treating a plastic film with the composition.

Another object is to provide a laminate having a silicone pressure-sensitive adhesive (PSA) layer sandwiched between two release liners having different release forces; a method for preparing the laminate; a method for using a substrate-less PSA sheet; and an article comprising the substrate-less PSA sheet.

Means for Solving the Problems

Making extensive investigations to attain the above objects, the inventor has found that when an organopolysiloxane of specific structure is added as high release component to a release agent composition for silicone PSA comprising an organopolysiloxane modified with a fluorinated organic group, the release coating obtained by coating and curing the composition can be increased in release force. Further, the inventor has found that when an organopolysiloxane of specific structure is added as high release component to a release agent composition for silicone PSA comprising an organopolysiloxane modified with a fluorinated organic group, the release coating obtained by coating and curing the composition can be increased in release force.

The inventor has also found that using two release liners, a first release liner treated with a release agent composition not having the high release component added thereto and a second release liner treated with a release agent composition having the high release component added thereto as the release liners for silicone PSA, there is a greater difference in release force between these release liners. There is obtained a laminate in which both the release liners are smoothly peelable, and no deformation of PSA layer occurs when the first release liner is peeled. The invention is predicated on these findings.

Accordingly, the invention provides a release agent composition for use with silicone PSA, and a release liner as defined below.

[1] A release agent composition for silicone pressure-sensitive adhesives, comprising
(A) 100 parts by weight of an organopolysiloxane having the average compositional formula (1):

[Chemical Formula 1]

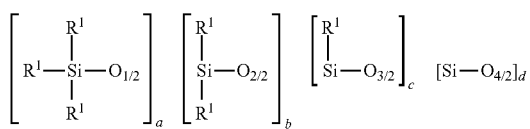

(1)

wherein $R^1$ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups $R^1$ containing a $C_2$-$C_{10}$ alkenyl-containing organic group, at least one of groups $R^1$ containing a $C_1$-$C_{10}$ fluoroalkyl group, a is an integer of at least 2, b is an integer of at least 1, c and d each are is an integer of at least 0, $50 \leq a+b+c+d \leq 5,000$, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups,
(B) an organohydrogenpolysiloxane having at least three Si—H groups per molecule, in such an amount as to give 1 to 10 moles of Si—H groups per mole of total alkenyl groups in components (A) and (F),
(C) a platinum group metal base catalyst for promoting hydrosilylation between alkenyl groups in components (A) and (F) and Si—H groups in component (B) for curing, in such an amount as to give 1 to 500 ppm of the metal based on the weight of component (A),
(E) 0 to 2,000 parts by weight of an organic solvent, and
(F) 1 to 25 parts by weight of an organopolysiloxane containing 0.001 mole per 100 g of alkenyl groups and being free of fluoroalkyl groups.

[2] The release agent composition for silicone pressure-sensitive adhesives of [1], further comprising (D) 0.01 to 5 parts by weight of a reaction regulator per 100 parts by weight of component (A).

[3] The release agent composition for silicone pressure-sensitive adhesives of [1] or [2], wherein component (A) is (A-1) an organopolysiloxane having at least two alkenyl-containing organic groups and at least one fluoroalkyl group per molecule, and containing 0.001 to less than 0.03 mole per 100 g of alkenyl groups and 0.1 to 0.5 mole per 100 g of fluoroalkyl groups and/or (A-2) an organopolysiloxane having at least two alkenyl-containing organic groups and at least one fluoroalkyl group per molecule, and containing 0.03 to 0.5 mole per 100 g of alkenyl groups and 0.1 to 0.5 mole per 100 g of fluoroalkyl groups.

[4] The release agent composition for silicone pressure-sensitive adhesives of [3], wherein component (A) contains components (A-1) and (A-2), and a ratio of component (A-1) to component (A-2) is from 20:80 to 80:20 in weight ratio.

[5] The release agent composition for silicone pressure-sensitive adhesives of any one of [1] to [4], wherein the fluoroalkyl group in component (A) is selected from the group consisting of 3,3,3-trifluoropropyl, 3,3,4,4,4-pentafluorobutyl, 3,3,4,4,5,5,5-heptafluoropentyl, 3,3,4,4,5,5,6,6,6-nonafluorohexyl, 3,3,4,4,5,5,6,6,7,7,7-undecafluoroheptyl, 3,3,4,4,5,5,6,6,7,7,8,8,8-tridecafluorooctyl, and 3,3,4,4,5,5,6,6,7,7,8,8,9,9,9-pentadecafluorononyl.

[6] The release agent composition for silicone pressure-sensitive adhesives of any one of [1] to [5], wherein component (B) contains a fluoroalkyl group.

[7] The release agent composition for silicone pressure-sensitive adhesives of [6], wherein the fluoroalkyl group in component (B) is 3,3,3-trifluoropropyl.

[8] A release liner comprising a plastic film treated with the release agent composition for silicone pressure-sensitive adhesives of any one of [1] to [7].

The invention further provides a laminate, its preparation method, use of a substrate-less adhesive sheet, and an article as defined below.

[9] A laminate of a structure comprising
a first release liner,
a pressure-sensitive adhesive layer, and
a second release liner,
stacked in the described order, wherein a release surface of the first release liner (disposed in contact with the pressure-sensitive adhesive layer) is treated with a release agent composition (I) for silicone pressure-sensitive adhesives comprising the following components (A) to (C) and optional component (E), and a release surface of the second release liner (disposed in contact with the pressure-sensitive adhesive layer) is treated with a release agent composition (II) for silicone pressure-sensitive adhesives comprising the following components (A) to (C), (F) and optional component (E),
(A) 100 parts by weight of an organopolysiloxane having the average compositional formula (1):

[Chemical Formula 2]

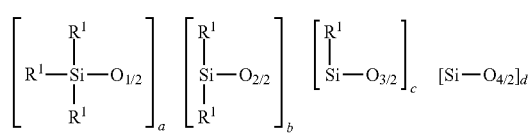

(1)

wherein $R^1$ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups $R^1$ containing a $C_2$-$C_{10}$ alkenyl-containing organic group, at least one of groups $R^1$ containing a $C_1$-$C_{10}$ fluoroalkyl group, a is an integer of at least 2, b is an integer of at least 1, c and d each are is an integer of at least 0, $50 \leq a+b+c+d \leq 5,000$, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups,
(B) an organohydrogenpolysiloxane having at least three Si—H groups per molecule, in such an amount as to give 1 to 10 moles of Si—H groups per mole of total alkenyl groups in components (A) and (F), (C) a platinum group metal base catalyst for promoting hydrosilylation between alkenyl groups in components (A) and (F) and Si—H groups in component (B) for curing, in such an amount as to give 1 to 500 ppm of the metal based on the weight of component (A), (E) 0 to 2,000 parts by weight of an organic solvent, and (F) 1 to 25 parts by weight of an organopolysiloxane containing 0.001 to 0.1 mole per 100 g of alkenyl groups and being free of fluoroalkyl groups.

[10] The laminate of [9] wherein said pressure-sensitive adhesive layer is a cured product of a silicone pressure-sensitive adhesive composition comprising (G) 30 to 70 parts by weight of an organopolysiloxane having the average compositional formula (5):

$$R_w^5SiO_{(4-w)/2} \quad (5)$$

wherein $R^5$ is independently a substituted or unsubstituted $C_1$-$C_{10}$ monovalent hydrocarbon group free of aliphatic unsaturation or a $C_2$-$C_{10}$ alkenyl-containing organic group, and w is a positive number of 1.8 to 2.2, the organopolysiloxane having at least two alkenyl-containing organic groups per molecule, and containing 0.0007 to 0.05 mole per 100 g of alkenyl groups, (H) 70 to 30 parts by weight of an organopolysiloxane containing $R_3^6SiO_{1/2}$ units and $SiO_{4/2}$ units in a molar ratio of from 0.5/1 to 1/1, wherein $R^6$ is independently a $C_1$-$C_{10}$ monovalent hydrocarbon group free of aliphatic unsaturation or a $C_2$-$C_6$ alkenyl group, the total of components (G) and (H) being 100 parts by weight, (I) an organohydrogenpolysiloxane having the average compositional formula (7):

$$R_y^7H_zSiO_{(4-y-z)/2} \quad (7)$$

wherein $R^7$ is independently a substituted or unsubstituted $C_1$-$C_{10}$ monovalent hydrocarbon group, y and z are positive numbers meeting y>0, z>0, and 0<y+z≤3, and containing at least three Si—H groups per molecule, in such an amount as to give 0.2 to 20 moles of Si—H groups per mole of total alkenyl groups in components (G) and (H), (J) a platinum group metal base catalyst for promoting hydrosilylation between alkenyl groups in components (G) and (H) and Si—H groups in component (I) for curing, in such an amount as to give 1 to 500 ppm of the metal based on the total weight of components (G) to (I), and (K) 0.01 to 5 parts by weight of a reaction regulator relative to the total weight of components (G) and (H).

[11] The laminate of [9] or [10] wherein the substrate of the release liner is a plastic film.

[12] A method for preparing the laminate of any one of [9] to [11], comprising the steps of furnishing the second release liner treated with the release agent composition (II) for silicone pressure-sensitive adhesives, applying the silicone pressure-sensitive adhesive composition onto the treated surface of the release liner, curing the composition to form a pressure-sensitive adhesive layer, and attaching the first release liner treated with the release agent composition (I) for silicone pressure-sensitive adhesives to the pressure-sensitive adhesive layer.

[13] A method for using a substrate-free pressure-sensitive adhesive sheet, comprising the steps of peeling the first release liner from the laminate of any one of [9] to [11], attaching one surface of the pressure-sensitive adhesive layer to an object, peeling the second release liner therefrom, attaching the opposite surface of the pressure-sensitive adhesive layer to another object.

[14] An article comprising the substrate-free pressure-sensitive adhesive sheet obtained from the use method of [13].

Advantageous Effects of the Invention

Using the release agent composition for silicone PSA according to the invention, the release force of the release agent can be increased simply by adding an inexpensive material thereto, without a need to prepare a material having a varying fluorine content. Using the laminate of the invention, a double-side adhesive silicone sheet without substrates can be prepared.

EMBODIMENT FOR CARRYING OUT THE INVENTION

Below the invention is described in detail.

The invention provides a release agent composition for silicone PSA, comprising (A) an organopolysiloxane having the average compositional formula (1):

[Chemical Formula 3]

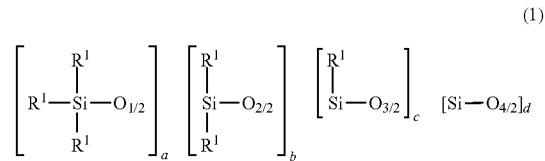

(1)

wherein $R^1$ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups $R^1$ containing a $C_2$-$C_{10}$ alkenyl-containing organic group, at least one of groups $R^1$ containing a $C_1$-$C_{10}$ fluoroalkyl group, a is an integer of at least 2, b is an integer of at least 1, c and d each are is an integer of at least 0, 50≤a+b+c+d≤5,000, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups, (B) an organohydrogenpolysiloxane having at least three Si—H groups per molecule, (C) a platinum group metal base catalyst, (F) an organopolysiloxane containing 0.001 to 0.1 mole per 100 g of alkenyl groups and being free of fluoroalkyl groups, and optionally, (D) a reaction regulator, and (E) an organic solvent.

[Component (A)]

Component (A) is an organopolysiloxane represented by the average compositional formula (1), having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups.

[Chemical Formula 4]

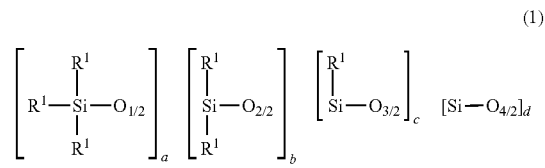

(1)

Herein $R^1$ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups $R^1$ containing a $C_2$-$C_{10}$ alkenyl-containing organic group, at least one of groups $R^1$ containing a $C_1$-$C_{10}$ fluoroalkyl group, a is an integer of at least 2, b is an integer of at least 1, c and d each are is an integer of at least 0, and $50 \leq a+b+c+d \leq 5,000$.

In formula (1), $R^1$ is a substituted or unsubstituted $C_1$-$C_{10}$, especially $C_1$-$C_8$ monovalent hydrocarbon group free of aliphatic unsaturation or a $C_2$-$C_{10}$, especially $C_2$-$C_8$ alkenyl-containing organic group, at least two groups $R^1$ per molecule are $C_2$-$C_{10}$ alkenyl-containing organic groups, and at least one group $R^1$ per molecule is a $C_1$-$C_{10}$ fluoroalkyl group.

Of $R^1$, the $C_2$-$C_{10}$ alkenyl-containing organic groups are preferably of 2 to 8 carbon atoms, and include alkenyl groups such as vinyl, allyl, hexenyl, and octenyl, acryloylalkyl and methacryloylalkyl groups such as acryloylpropyl, acryloylmethyl, and methacryloylpropyl, cycloalkenylalkyl groups such as cyclohexenylethyl, and alkenyloxyalkyl groups such as vinyloxypropyl, with vinyl being most preferred.

Also, the $C_1$-$C_{10}$ fluoroalkyl groups are preferably of 1 to 8 carbon atoms, and include 3,3,3-trifluoropropyl, 3,3,4,4,4-pentafluorobutyl, 3,3,4,4,5,5,5-heptafluoropentyl, 3,3,4,4,5,5,6,6,6-nonafluorohexyl, 3,3,4,4,5,5,6,6,7,7,7-undecafluoroheptyl, 3,3,4,4,5,5,6,6,7,7,8,8,8-tridecafluorooctyl, and 3,3,4,4,5,5,6,6,7,7,8,8,9,9,9-pentadecafluorononyl, with 3,3,3-trifluoropropyl being most preferred.

Of $R^1$, examples of the monovalent hydrocarbon groups other than the alkenyl-containing organic group and fluoroalkyl group include alkyl groups such as methyl, ethyl, propyl, and butyl, cycloalkyl groups such as cyclohexyl, aryl groups such as phenyl, and substituted forms of the foregoing in which one or more or even all of carbon-bonded hydrogen atoms are substituted by halogen atoms or the like. Of these, aliphatic saturated hydrocarbon groups or aromatic hydrocarbon groups are preferred, with methyl and phenyl being most preferred.

With respect to subscripts a to d in formula (1), a is an integer of at least 2, preferably 2 to 6, b is an integer of at least 1, preferably 1 to 4,998, c and d each are an integer of at least 0, preferably 0 to 5, and $50 \leq a+b+c+d \leq 5,000$, preferably $80 \leq a+b+c+d \leq 3,000$. If $a+b+c+d<50$, then crosslinking points are too many, with a lowering of reactivity. If $a+b+c+d>5,000$, then the composition has a very high viscosity and becomes inefficient to work because of difficulty to agitate or mix.

The content of alkenyl groups in component (A) is 0.001 to 0.5 mole, preferably 0.002 to 0.45 mole, and more preferably 0.003 to 0.4 mole per 100 g of the organopolysiloxane. An alkenyl content of less than 0.001 mole deteriorates the bond to the substrate whereas an alkenyl content in excess of 0.5 mole invites poor curability.

It is noted that the alkenyl content may be measured by adding a 10 wt % potassium iodide aqueous solution to a sample, stirring the mixture to form a test solution, and adding dropwise 0.1N sodium thiosulfate to the test solution until the test solution turns colorless.

The content of fluoroalkyl groups in component (A) is 0.1 to 0.5 mole, preferably 0.15 to 0.45 mole, and more preferably 0.2 to 0.4 mole per 100 g of the organopolysiloxane. A fluoroalkyl content of less than 0.1 mole fails to provide sufficient release relative to silicone PSA, with the PSA undergoing cohesive failure. A fluoroalkyl content of more than 0.5 mole leads to a lowering of solubility in organic solvent.

Specific structures of component (A) are shown below, but not limited thereto. In the formulae, Me, Vi, and Ph stand for methyl, vinyl, and phenyl, respectively.

[Chemical Formula 5]

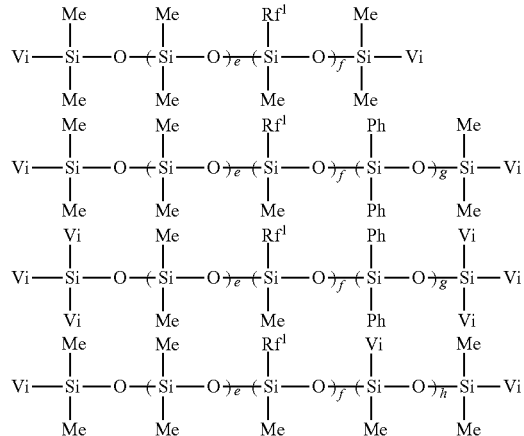

In the formulae, $Rf^1$ is independently a fluoroalkyl group, e is an integer of 50 to 4,997, preferably 60 to 3,000, f is an integer of 1 to 1,000, preferably 10 to 500, g is an integer of 0 to 100, preferably 0 to 50, and h is an integer of 1 to 2,000, preferably 10 to 1,000.

Illustrative examples of $Rf^1$ are shown below.

[Chemical Formula 6]

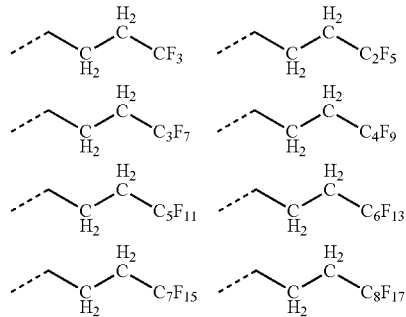

Herein the broken line depicts a valence bond.

Component (A) is generally prepared by ring-opening polymerization of a cyclic low-molecular siloxane such as octamethylcyclotetrasiloxane, a cyclic low-molecular siloxane containing an alkenyl-containing organic group, and a cyclic low-molecular siloxane containing a fluoroalkyl group, in the presence of a catalyst. Since the reaction product contains cyclic low-molecular siloxanes as the reactants at the end of polymerization, preferably the reaction product is treated by distilling off the cyclic low-molecular siloxanes at elevated temperature and reduced pressure while passing an inert gas into the reaction product, prior to use.

Although component (A) may be a single component, it is preferably component (A-1) and/or component (A-2), more preferably a mixture of components (A-1) and (A-2).

Component (A-1) is an organopolysiloxane encompassed in component (A) containing 0.001 to less than 0.03 mole per 100 g of alkenyl groups.

Also component (A-2) is an organopolysiloxane encompassed in component (A) containing 0.03 to 0.5 mole per 100 g of alkenyl groups.

The difference between components (A-1) and (A-2) resides in the content of alkenyl groups, and component (A-2) has a higher alkenyl content than component (A-1). On use of a mixture of components (A-1) and (A-2), the use of a raw material having a varying crosslinking density prevents zipping relative to the silicone PSA, ensuring smooth peeling. Although the definite reason is not well understood, it is presumed that a network having a low crosslinking density segregates on the surface, thereby preventing zipping relative to the silicone PSA and ensuring smooth peeling.

The content of alkenyl groups in component (A-1) is from 0.001 mole to less than 0.03 mole, preferably 0.002 to 0.025 mole, and more preferably 0.004 to 0.02 mole per 100 g of the organopolysiloxane. Component (A-1) having an alkenyl content of at least 0.001 mole provides tight adhesion to the substrate whereas component (A-1) having an alkenyl content of less than 0.03 mole provides release relative to the silicone PSA.

The content of alkenyl groups in component (A-2) is from 0.03 to 0.5 mole, preferably 0.035 to 0.45 mole, and more preferably 0.04 to 0.4 mole per 100 g of the organopolysiloxane. Component (A-2) having an alkenyl content of at least 0.03 mole provides release relative to the silicone PSA whereas component (A-2) having an alkenyl content of up to 0.5 mole provides curability.

When components (A-1) and (A-2) are used, preferably components (A-1) and (A-2) are mixed such that component (A) may have an alkenyl content in the above-defined range. Specifically, components (A-1) and (A-2) are mixed in a weight ratio of from 20:80 to 80:20, preferably from 25:75 to 75:25, and more preferably from 30:70 to 70:30. If component (A-1) is less than 20% by weight, sufficient release relative to the silicone PSA may not be exerted, causing cohesive failure to the PSA. If component (A-1) is more than 80% by weight, curability may lower. If component (A-2) is more than 80% by weight, tight adhesion to the substrate may lower. If component (A-2) is less than 20% by weight, sufficient release relative to the silicone PSA may not be exerted particularly in the case of attachment under heating, causing cohesive failure to the PSA.

[Component (B)]

Component (B) is an organohydrogenpolysiloxane having at least three Si—H groups per molecule. Specifically, an organohydrogenpolysiloxane of the structure having the general formula (2) may be used.

[Chemical Formula 7]

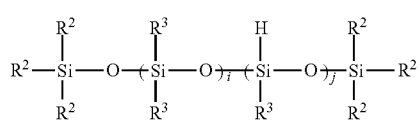

(2)

Herein $R^2$ is each independently a substituted or unsubstituted $C_1$-$C_{10}$ monovalent hydrocarbon group free of aliphatic unsaturation or hydrogen, $R^3$ is each independently a substituted or unsubstituted $C_1$-$C_{10}$ monovalent hydrocarbon group free of aliphatic unsaturation, i is an integer of 0 to 100, and j is an integer of 3 to 80.

In formula (2), $R^2$ is a substituted or unsubstituted $C_1$-$C_{10}$, especially $C_1$-$C_8$ monovalent hydrocarbon group free of aliphatic unsaturation or hydrogen. $R^3$ is a substituted or unsubstituted $C_1$-$C_{10}$, especially $C_1$-$C_8$ monovalent hydrocarbon group free of aliphatic unsaturation. Examples of the monovalent hydrocarbon group free of aliphatic unsaturation, represented by $R^2$ and $R^3$, include alkyl groups such as methyl, ethyl, propyl, and butyl, cycloalkyl groups such as cyclohexyl, aryl groups such as phenyl, and substituted forms of the foregoing in which one or more or even all of carbon-bonded hydrogen atoms are substituted by halogen atoms or the like, such as trifluoromethyl and 3,3,3-trifluoropropyl. Of these, aliphatic saturated hydrocarbon groups or aromatic hydrocarbon groups are preferred as $R^2$ and $R^3$, with methyl and phenyl being most preferred.

It is preferred herein that groups $R^2$ and $R^3$ contain at least one, preferably 2 to 10 fluoroalkyl groups. This is to make component (B) compatible with component (A) when they are mixed. Component (B) without fluoroalkyl groups may not be well compatible with component (A), i.e., component (B) may separate from the composition. Examples of the fluoroalkyl group include 3,3,3-trifluoropropyl, 3,3,4,4,4-pentafluorobutyl, 3,3,4,4,5,5,5-heptafluoropentyl, 3,3,4,4,5,5,6,6,6-nonafluorohexyl, 3,3,4,4,5,5,6,6,7,7,7-undecafluoroheptyl, 3,3,4,4,5,5,6,6,7,7,8,8,8-tridecafluorooctyl, and 3,3,4,4,5,5,6,6,7,7,8,8,9,9,9-pentadecafluorononyl, with 3,3,3-trifluoropropyl being most preferred.

In formula (2), i is an integer of 0 to 100, preferably 0 to 80; and j is an integer of 3 to 80, preferably 4 to 70.

Specific structures of component (B) are shown below, but not limited thereto. In the formulae, Me stands for methyl.

[Chemical Formula 8]

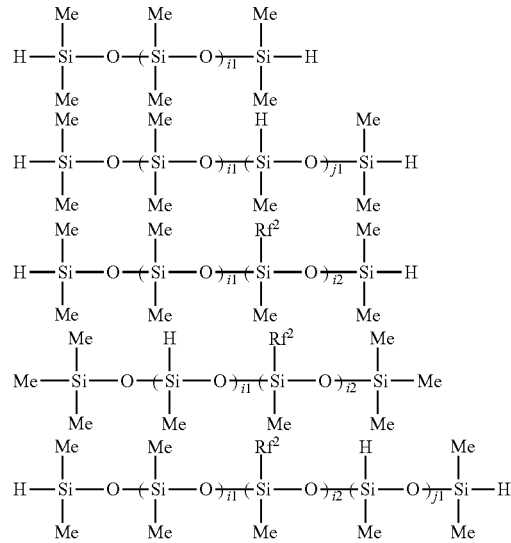

In the formulae, $Rf^2$ is independently a fluoroalkyl group, i1 is an integer of 0 to 99, preferably 0 to 80, j1 is an integer of 3 to 80, preferably 4 to 70, i2 is an integer of 1 to 40, preferably 2 to 30, and i1+i2 is an integer of 1 to 100, preferably 2 to 80.

Illustrative examples of $Rf^2$ are shown below.

[Chemical Formula 9]

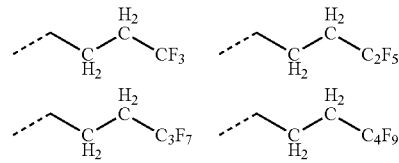

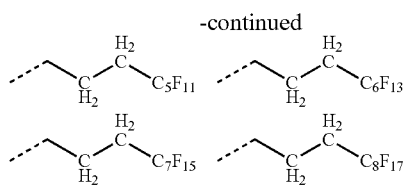

Herein the broken line depicts a valence bond.

Component (B) is generally prepared by ring-opening polymerization of a cyclic low-molecular siloxane such as octamethylcyclotetrasiloxane and a cyclic low-molecular siloxane containing a Si—H group such as tetramethylcyclotetrasiloxane in the presence of an acid catalyst. Since the reaction product contains cyclic low-molecular siloxanes as the reactants at the end of polymerization, preferably the reaction product is treated by distilling off the cyclic low-molecular siloxanes at elevated temperature and reduced pressure while passing an inert gas into the reaction product, prior to use.

Component (B) is used in such an amount as to give 1 to 10 moles, preferably 1.2 to 8 moles of Si—H groups per mole of total alkenyl groups in components (A) and (F). If the Si—H/alkenyl molar ratio is less than 1, the crosslinking density lowers and curability lowers. If the Si—H/alkenyl molar ratio exceeds 10, which means that more Si—H groups are left after curing, sufficient release relative to the silicone PSA may not be exerted, causing cohesive failure to the PSA.

[Component (C)]

Component (C) is a platinum group metal base catalyst for promoting hydrosilylation between alkenyl groups in components (A) and (F) and Si—H groups in component (B) for curing. Examples of the center metal in the catalyst include platinum group metals such as platinum, palladium, iridium, rhodium, osmium, and ruthenium, with platinum being preferred. Suitable platinum catalysts include chloroplatinic acid, alcohol solutions of chloroplatinic acid, reaction products of chloroplatinic acid with alcohols, reaction products of chloroplatinic acid with olefin compounds, and reaction products of chloroplatinic acid with vinyl-containing siloxanes.

Component (C) is added in such an amount as to give 1 to 500 ppm, preferably 2 to 450 ppm of the metal based on the weight of component (A). Below 1 ppm, the cured coating fails to exert characteristics of release force because of slow reaction and undercure. Above 500 ppm, the cured coating becomes less flexible.

[Component (D)]

Component (D) is a reaction regulator which is an optional component. When the release agent composition for silicone PSA is prepared or coated to a substrate, the reaction regulator serves to prevent addition reaction from starting prior to heat curing and to prevent the treatment fluid from thickening or gelling. The reaction regulator coordinates with the platinum group metal as the addition reaction catalyst to control the addition reaction, but when heated for curing, releases the coordination, allowing the catalyst to develop its activity. Any reaction regulators for the prior art addition reaction-curable silicone compositions may be used. Examples of the reaction regulator include 3-methyl-1-butyn-3-ol, 3-methyl-1-pentyn-3-ol, 3,5-dimethyl-1-hexyn-3-ol, 1-ethynylcyclohexanol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy) dimethylsilane, 1,3,5,7-tetramethyl-1,3,5,7-tetravinylcyclotetrasiloxane, 1,1,3,3-tetramethyl-1,3-divinyldisiloxane, maleic acid esters, and adipic acid esters.

When used, the reaction regulator is preferably added in an amount of 0.01 to 5 parts, more preferably 0.05 to 3 parts by weight per 100 parts by weight of component (A). A less amount of the reaction regulator may fail to control the reaction, allowing the composition to cure prior to working, whereas an excessive amount may retard the reaction, resulting in insufficient cure.

[Component (E)]

Component (E) is an organic solvent which is an optional component and used for reducing the viscosity of the composition to improve its workability or for improving the wettability of the composition upon coating to substrates. Suitable organic solvents include aromatic hydrocarbon solvents such as toluene and xylene; aliphatic hydrocarbon solvents such as hexane, heptane, octane, isooctane, decane, cyclohexane, methylcyclohexane and isoparaffin; other hydrocarbon solvents such as industrial gasoline (rubber solvent or the like), petroleum benzine, and solvent naphtha; ketone solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone; ester solvents such as ethyl acetate, propyl acetate, isopropyl acetate, butyl acetate, and isobutyl acetate; ether solvents such as diethyl ether, dipropyl ether, diisopropyl ether, dibutyl ether, 1,2-dimethoxyethane, and 1,4-dioxane; solvents having ester and ether moieties such as 2-methoxyethyl acetate, 2-ethoxyethyl acetate, propylene glycol monomethyl ether acetate, and 2-butoxyethyl acetate; siloxane solvents such as hexamethyldisiloxane, octamethyltrisiloxane, octamethylcyclotetrasiloxane, decamethylcyclopentasiloxane, tris(trimethylsiloxy)methylsilane, and tetrakis(trimethylsiloxy)silane; fluorinated solvents such as trifluorotoluene, hexafluoroxylene, methyl nonafluorobutyl ether, and ethyl nonafluorobutyl ether, and mixtures thereof. Of these, industrial gasoline (rubber solvent or the like) and isoparaffin are preferably used.

When used, component (E) is preferably added in an amount of 0 to 2,000 parts, more preferably 20 to 1,800 parts by weight per 100 parts by weight of component (A). If the amount of component (E) exceeds 2,000 parts by weight, which means that the amount of active ingredients becomes smaller, then the coating weight may become short, failing to provide sufficient release.

[Component (F)]

Component (F) is an organopolysiloxane containing 0.001 to 0.1 mole per 100 g of alkenyl groups and being free of fluoroalkyl groups.

When added to the release agent composition for silicone PSA, component (F) serves to increase the release force relative to the silicone PSA. As alluded to previously, a release agent based on an organopolysiloxane modified with a fluorinated organic group is often used in release agent compositions for silicone PSA. It is presumed that once an organopolysiloxane containing a specific amount of alkenyl-containing organic groups, but free of fluoroalkyl groups is added to such a composition, this organopolysiloxane forms a sea-island structure rather than completely mixing with the organopolysiloxane modified with a fluorinated organic group when a cured coating is formed on a substrate, resulting in a greater release force.

Component (F) is preferably an organopolysiloxane represented by the average compositional formula (3), containing 0.001 to 0.1 mole per 100 g of alkenyl groups, and being free of fluoroalkyl groups.

[Chemical Formula 10]

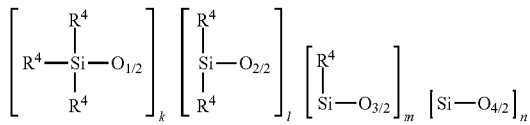

(3)

Herein $R^4$ which may be the same or different is a $C_1$-$C_{10}$ monovalent hydrocarbon group free of aliphatic unsaturation or a $C_2$-$C_{10}$ alkenyl-containing organic group, k is an integer of at least 2, l is an integer of at least 1, m and n each are is an integer of at least 0, and $50 \leq k+l+m+n \leq 1,500$.

In formula (3), $R^4$ is a $C_1$-$C_{10}$, especially $C_1$-$C_8$ monovalent hydrocarbon group free of aliphatic unsaturation or a $C_2$-$C_{10}$, especially $C_2$-$C_8$ alkenyl-containing organic group. Of these, alkenyl groups are contained in an amount of 0.001 to 0.1 mole per 100 g, and no fluoroalkyl groups are contained.

Of $R^4$, examples of the monovalent hydrocarbon groups free of aliphatic unsaturation include alkyl groups such as methyl, ethyl, propyl, and butyl, cycloalkyl groups such as cyclohexyl, and aryl groups such as phenyl, with methyl and phenyl being most preferred.

Also, the $C_2$-$C_{10}$ alkenyl-containing organic groups are preferably of 2 to 8 carbon atoms, and include alkenyl groups such as vinyl, allyl, hexenyl, and octenyl, acryloylalkyl and methacryloylalkyl groups such as acryloylpropyl, acryloylmethyl, and methacryloylpropyl, cycloalkenylalkyl groups such as cyclohexenylethyl, and alkenyloxyalkyl groups such as vinyloxypropyl, with vinyl being most preferred.

The content of alkenyl groups in component (F) is 0.001 to 0.1 mole, preferably 0.0015 to 0.08 mole, and more preferably 0.002 to 0.06 mole per 100 g of the organopolysiloxane. An alkenyl content of less than 0.001 mole adversely affects the outer appearance of a cured coating whereas an alkenyl content in excess of 0.1 mole leads to a weakening of release force enhancing effect.

With respect to subscripts k to n in formula (3), k is an integer of at least 2, preferably 2 to 6, l is an integer of at least 1, preferably 48 to 1,498, m and n each are an integer of at least 0, preferably 0 to 5, and k+l+m+n is 50 to 1,500, preferably 80 to 1,400, and more preferably 100 to 1,200. A too small value of k+l+m+n may fail to fully increase the release force whereas a too large value may adversely affect the outer appearance of a cured coating.

Specific structures of component (F) are shown below, but not limited thereto. In the formulae, Me, Vi, and Ph stand for methyl, vinyl, and phenyl, respectively.

[Chemical Formula 11]

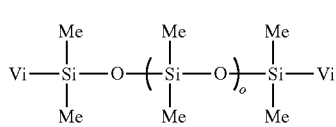

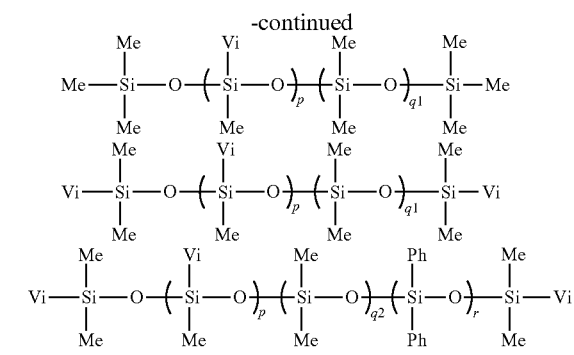

In the formulae, o is an integer of 48 to 1,498, preferably 78 to 1,398, p is an integer of 1 to 20, preferably 2 to 15, q1 is an integer of 47 to 1,497, preferably 78 to 1,397, q2 is an integer of 1 to 1,496, preferably 2 to 1,396, r is an integer of 1 to 1,449, preferably 78 to 1,349, p+q1 and p+q2+r each are an integer of 48 to 1,498.

[Chemical Formula 12]

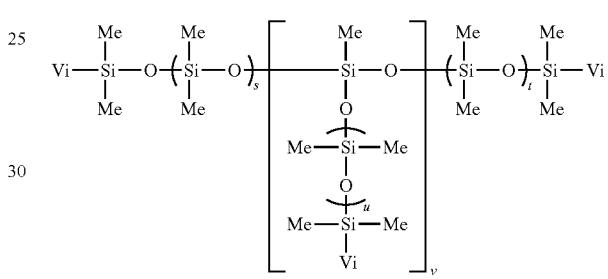

In the formula, s is an integer of 5 to 1,491, preferably 10 to 1,398, t is an integer of 5 to 1,491, preferably 10 to 1,398, u is an integer of 0 to 1,476, preferably 0 to 1,376, and v is an integer of 1 to 739, preferably 1 to 689.

Component (F) is generally prepared by ring-opening polymerization of a cyclic low-molecular siloxane such as octamethylcyclotetrasiloxane and a cyclic low-molecular siloxane containing an alkenyl-containing organic group in the presence of a catalyst. Since the reaction product contains cyclic low-molecular siloxanes as the reactants at the end of polymerization, preferably the reaction product is treated by distilling off the cyclic low-molecular siloxanes at elevated temperature and reduced pressure while passing an inert gas into the reaction product, prior to use.

Component (F) is used in an amount of 1 to 25 parts, preferably 2 to 20 parts by weight per 100 parts by weight of component (A). Less than 1 part by weight of component (F) fails to fully increase the release force whereas more than 25 parts by weight adversely affects the release relative to the silicone PSA.

Although the release agent composition for silicone PSA according to the invention may be obtained by mixing predetermined amounts of the foregoing components, other additives such as a photopolymerization initiator, antioxidant, reactive diluent, leveling agent, filler, antistatic agent, defoamer, and pigment may be added as long as the objects and effects of the invention are not impaired.

The release agent composition for silicone PSA according to the invention is desirably prepared by previously mixing components (A), (B), (F) and optional components until uniform, and adding component (C) thereto immediately before use.

The release agent composition for silicone PSA according to the invention may be coated and cured to a substrate, yielding a release liner.

The substrate which is coated with the release agent composition for silicone PSA is selected from paper, plastic film, glass and metal. Suitable paper sheets include wood-free paper, coated paper, art paper, glassine paper, polyethylene-laminated paper, and kraft paper. Suitable plastic films include polyethylene film, polypropylene film, polyester film, polyimide film, polyvinyl chloride film, polyvinylidene chloride film, polyvinyl alcohol film, polycarbonate film, polytetrafluoroethylene film, polystyrene film, ethylene-vinyl acetate copolymer film, ethylene-vinyl alcohol copolymer film, triacetylcellulose film, polyether ether ketone film, and polyphenylene sulfide film. The glass is not particularly limited in thickness and type, and may or may not be chemically strengthened. Also glass fibers are applicable, and may be used alone or as a composite form with resin. Examples of the metal include aluminum foil, copper foil, gold foil, silver foil and nickel foil. Inter alia, polyester film is preferred for the release liner use.

The release agent composition for silicone PSA may be coated to a substrate by any of well-known coating techniques, for example, wire bar, comma coater, lip coater, roll coater, die coater, knife coater, blade coater, rod coater, kiss coater, gravure coater, screen printing, dipping, and casting.

The coating weight of the release agent composition for silicone PSA to a substrate is preferably in a range of 0.1 to 2 g/m², more preferably 0.2 to 1.8 g/m² as solids. The curing conditions include 80 to 180° C., especially 90 to 160° C. and 10 to 180 seconds, especially 15 to 150 seconds, but are not limited thereto.

Now that component (F) is added to the release agent composition for silicone PSA, the release agent obtained by coating and curing the composition is increased in release force. To obtain an index for demonstrating the effect of component (F), it is assumed that a release agent composition for silicone PSA comprising components (A) to (C) and optionally components (D) and (E) is designated composition (I), and an inventive release agent composition for silicone PSA having component (F) added thereto (that is, comprising components (A) to (C), (F) and optionally components (D) and (E)) is designated composition (II). The addition of component (F) ensures that, in a test where composition (II) is coated and cured to a substrate to form a release liner, a silicone PSA composition is coated and cured to the release liner, and another substrate is attached thereto, the release force required to peel the liner from the PSA layer is greater than that for the release liner in which composition (I) is coated and cured to a substrate. Presumably this is because the organopolysiloxane (F) forms a sea-island structure rather than completely mixing with the organopolysiloxane modified with a fluorinated organic group when a cured coating is formed on a substrate. Understandably, the addition of component (F) increases the release force without a need for a release agent having a different fluorine content.

Accordingly, the invention also provides a laminate as defined below; a laminate of a structure comprising
   a first release liner,
   a pressure-sensitive adhesive (PSA) layer, and
   a second release liner,
stacked in the described order, wherein a release surface of the first release liner (disposed in contact with the PSA layer) is treated with a release agent composition (I) for silicone PSA comprising the following components (A) to (C) and optional component (E), and a release surface of the second release liner (disposed in contact with the PSA layer) is treated with a release agent composition (II) for silicone PSA comprising the following components (A) to (C), (F) and optional component (E), (A) 100 parts by weight of an organopolysiloxane having the average compositional formula (1):

[Chemical Formula 13]

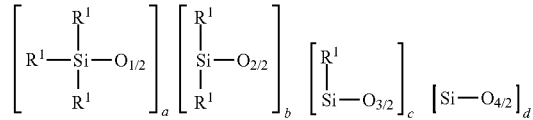

wherein $R^1$ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups $R^1$ containing a $C_2$-$C_{10}$ alkenyl-containing organic group, at least one of groups $R^1$ containing a $C_1$-$C_{10}$ fluoroalkyl group, a is an integer of at least 2, b is an integer of at least 1, c and d each are is an integer of at least 0, 50≤a+b+c+d≤5,000, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups, (B) an organohydrogenpolysiloxane having at least three Si—H groups per molecule, in such an amount as to give 1 to 10 moles of Si—H groups per mole of total alkenyl groups in components (A) and (F), (C) a platinum group metal base catalyst for promoting hydrosilylation between alkenyl groups in components (A) and (F) and Si—H groups in component (B) for curing, in such an amount as to give 1 to 500 ppm of the metal based on the weight of component (A), (E) 0 to 2,000 parts by weight of an organic solvent, and (F) 1 to 25 parts by weight of an organopolysiloxane containing 0.001 to 0.1 mole per 100 g of alkenyl groups and being free of fluoroalkyl groups.

Component (F) is blended only in the release agent composition (II) for silicone PSA. Once component (F) is added to the release agent composition (II) for silicone PSA, the release force of the second release liner treated with the composition (II) relative to the PSA layer is increased. As alluded to previously, a release agent based on an organopolysiloxane modified with a fluorinated organic group is often used in release agent compositions for silicone PSA. It is presumed that once an organopolysiloxane containing a specific amount of alkenyl-containing organic groups, but free of fluoroalkyl groups is added to such a composition, this organopolysiloxane forms a sea-island structure rather than completely mixing with the organopolysiloxane modified with a fluorinated organic group when a cured coating is formed on a substrate, resulting in a greater release force.

The release agent composition (I) for silicone PSA as used herein is desirably prepared by previously mixing components (A), (B), and optional components until uniform, and adding component (C) thereto immediately before use.

The release agent composition (II) for silicone PSA as used herein is desirably prepared by previously mixing components (A), (B), (F) and optional components until uniform, and adding component (C) thereto immediately before use.

With respect to the release agent composition (I) for silicone PSA comprising components (A) to (C), and optionally (D), (E) and other components, and the release agent composition (II) for silicone PSA having component (F) added to composition (I), the addition of component (F) ensures that, in a test where release agent composition (II) is coated and cured to a substrate to form a release liner, a silicone PSA composition is coated and cured to the release liner, and another substrate is attached thereto, the release force required to peel the substrate and the PSA layer from the release liner is greater than that for the release liner in which release agent composition (I) is coated and cured to a substrate.

[Method for preparing laminate]

The laminate is prepared by furnishing the second release liner treated with the release agent composition (II) for silicone PSA, applying the silicone PSA composition onto the treated surface of the release liner, curing the composition to form a PSA layer, and attaching the first release liner treated with the release agent composition (I) for silicone PSA to the PSA layer.

When the silicone PSA composition is coated and cured to the second release liner having the release agent composition (II) for silicone PSA coated and cured to a substrate, and the first release liner having the release agent composition (I) for silicone PSA coated and cured to a substrate is attached thereto, there arises a difference in release force between the two release liners. This enables that the first release liner treated with the release agent composition (I) having a lower release force be selectively peeled in advance, preventing a deformation of PSA layer. A substrate-less (or carrier-less) silicone adhesive sheet can be manufactured by peeling the first release liner treated with the release agent composition (I) for silicone PSA, attaching the PSA layer to an object, then peeling the second release liner treated with the release agent composition (II) for silicone PSA, and attaching the thus exposed surface of the PSA layer to another object.

The substrates which are coated with the release agent compositions (I) and (II) for silicone PSA are selected from paper, plastic film, glass and metal. Suitable paper sheets include wood-free paper, coated paper, art paper, glassine paper, polyethylene-laminated paper, and kraft paper. Suitable plastic films include polyethylene film, polypropylene film, polyester film, polyimide film, polyvinyl chloride film, polyvinylidene chloride film, polyvinyl alcohol film, polycarbonate film, polytetrafluoroethylene film, polystyrene film, ethylene-vinyl acetate copolymer film, ethylene-vinyl alcohol copolymer film, triacetylcellulose film, polyether ether ketone film, and polyphenylene sulfide film. The glass is not particularly limited in thickness and type, and may or may not be chemically strengthened. Also glass fibers are applicable, and may be used alone or as a composite form with resin. Examples of the metal include aluminum foil, copper foil, gold foil, silver foil and nickel foil. Inter alfa, polyester film is preferred for the release liner use.

The release agent compositions (I) and (II) for silicone PSA may be coated to substrates by any of well-known coating techniques, for example, wire bar, comma coater, lip coater, roll coater, die coater, knife coater, blade coater, rod coater, kiss coater, gravure coater, screen printing, dipping, and casting.

The coating weight of the release agent compositions (I) and (II) for silicone PSA each to a substrate is preferably in a range of 0.1 to 2 g/m², more preferably 0.2 to 1.8 g/m² as solids. The curing conditions include heating at 80 to 180° C., especially 90 to 160° C. for 10 to 180 seconds, especially 15 to 150 seconds, but are not limited thereto.

Furthermore, provided that a release agent composition for silicone PSA comprising components (A) to (C) and optionally components (D) and (E) is designated composition (I), and an inventive release agent composition for silicone PSA comprising components (A) to (C), (F) and optionally components (D) and (E) is designated composition (II), X is a release force required in a peeling test involving the steps of coating and curing composition (I) on a first substrate, coating and curing a silicone PSA composition thereon to form a silicone PSA layer, attaching it to a second substrate, and peeling the second substrate and the silicone PSA layer from the first substrate having composition (I) coated and cured thereto in a direction of 180° at a rate of 0.3 m/min, by means of a tensile tester, and Y is a release force required in a peeling test involving the steps of coating and curing composition (II) on a first substrate, coating and curing a silicone PSA composition thereon to form a silicone PSA layer, attaching it to a second substrate, and peeling the second substrate and the silicone PSA layer from the first substrate having composition (II) coated and cured thereto in a direction of 180° at a rate of 0.3 m/min, by means of the tensile tester, the inventive release agent composition for silicone PSA preferably meets the following formula (4).

$$1.50 \leq Y/X \tag{4}$$

The preferred silicone PSA composition is a composition comprising the following components:

(G) an organopolysiloxane having the average compositional formula (5):

$$R_w^5 SiO_{(4-w)/2} \tag{5}$$

wherein $R^5$ is independently a substituted or unsubstituted $C_1$-$C_{10}$ monovalent hydrocarbon group free of aliphatic unsaturation or a $C_2$-$C_{10}$ alkenyl-containing organic group, and w is a positive number of 1.8 to 2.2, the organopolysiloxane having at least two alkenyl-containing organic groups per molecule, and containing 0.0007 to 0.05 mole per 100 g of alkenyl groups, (H) an organopolysiloxane containing $R_3^6 SiO_{1/2}$ units and $SiO_{4/2}$ units in a molar ratio of from 0.5/1 to 1/1, wherein $R^6$ is independently a $C_1$-$C_{10}$ monovalent hydrocarbon group free of aliphatic unsaturation or a $C_2$-$C_6$ alkenyl group, (I) an organohydrogenpolysiloxane having the average compositional formula (7):

$$R_y^7 H_z SiO_{(4-y-z)/2} \tag{7}$$

wherein $R^7$ is independently a substituted or unsubstituted $C_1$-$C_{10}$ monovalent hydrocarbon group, y and z are positive numbers meeting y>0, z>0, and 0<y+z≤3, and containing at least three Si—H groups per molecule, (J) a platinum group metal base catalyst, and (K) a reaction regulator.

[Component (G)]

Component (G) is an organopolysiloxane represented by the average compositional formula (5), having at least two alkenyl-containing organic groups per molecule, and containing 0.0007 to 0.05 mole per 100 g of alkenyl groups.

$$R_w^5 SiO_{(4-w)/2} \tag{5}$$

Herein $R^5$ is independently a substituted or unsubstituted $C_1$-$C_{10}$ monovalent hydrocarbon group free of aliphatic unsaturation or a $C_2$-$C_{10}$ alkenyl-containing organic group, and w is a positive number of 1.8 to 2.2, preferably 1.9 to 2.1.

In formula (5), $R^5$ is a substituted or unsubstituted $C_1$-$C_{10}$, preferably $C_1$-$C_8$ monovalent hydrocarbon group free of aliphatic unsaturation or a $C_2$-$C_{10}$, preferably $C_2$-$C_8$ alkenyl-containing organic group, at least two of groups $R^5$ are alkenyl-containing organic groups.

Examples of the substituted or unsubstituted $C_1$-$C_{10}$ monovalent hydrocarbon group free of aliphatic unsaturation represented by $R^5$ include alkyl groups such as methyl, ethyl, propyl and butyl, cycloalkyl groups such as cyclohexyl, and aryl groups such as phenyl, and substituted forms of the foregoing groups in which some or all carbon-bonded hydrogen atoms are substituted by halogen atoms or the like, such as trifluoromethyl and 3,3,3-trifluoropropyl. Among others, saturated aliphatic hydrocarbon groups and aromatic hydrocarbon groups are preferable, with methyl and phenyl being most preferred.

Examples of the $C_2$-$C_{10}$, preferably $C_2$-$C_8$ alkenyl-containing organic groups include alkenyl groups such as vinyl, allyl, hexenyl, and octenyl, acryloylalkyl and methacryloylalkyl groups such as acryloylpropyl, acryloylmethyl, and methacryloylpropyl, cycloalkenylalkyl groups such as cyclohexenylethyl, and alkenyloxyalkyl groups such as vinyloxypropyl, with vinyl being most preferred.

The content of alkenyl groups in component (G) is 0.0007 to 0.05 mole, preferably 0.001 to 0.04 mole, and more preferably 0.001 to 0.03 mole per 100 g of the organopolysiloxane. An alkenyl content of less than 0.0007 mole may lead to a lower crosslinking density, with a likelihood of cohesive failure in the silicone PSA layer. If the alkenyl content exceeds 0.05 mole, the silicone PSA layer may become hard, failing to gain appropriate adhesion or tack.

Examples of component (G) include organopolysiloxanes having the general formula (6), but are not limited thereto.

[Chemical Formula 14]

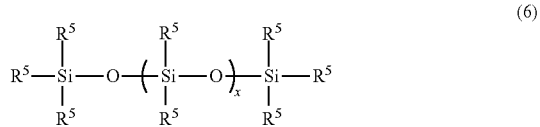

(6)

Herein $R^5$ is as defined above, at least two of groups $R^5$ are alkenyl-containing organic groups, and x is an integer of 50 to 15,000.

In formula (6), x is a positive number of 50 to 15,000, preferably 200 to 12,000. If x<50, reactivity may lower due to excessive crosslinking points. If x>15,000, the organopolysiloxane may have a very high viscosity so that the composition may become difficult to agitate and mix and inefficient to work.

Specific structures of component (G) are shown below, but not limited thereto. In the formulae, Me, Vi, and Ph stand for methyl, vinyl, and phenyl, respectively.

[Chemical Formula 15]

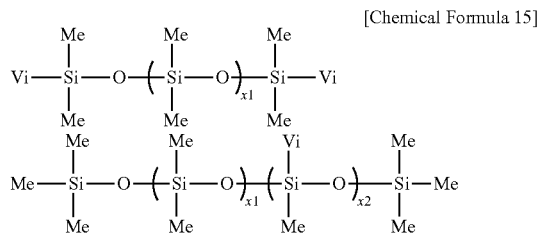

-continued

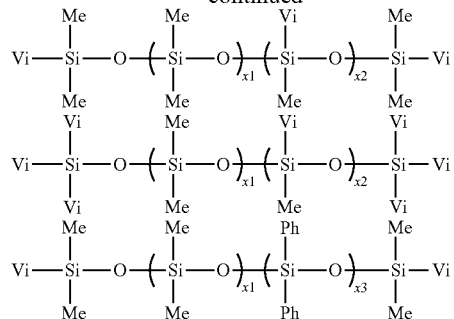

In the formulae, x1 is an integer of at least 50, preferably 100 to 14,997, x2 is an integer of at least 1, preferably 1 to 100, and x3 is an integer of at least 1, preferably 2 to 150.

Component (G) is generally prepared by ring-opening polymerization of a cyclic low-molecular siloxane such as octamethylcyclotetrasiloxane and a cyclic low-molecular siloxane containing an alkenyl-containing organic group in the presence of a catalyst. Since the reaction product contains cyclic low-molecular siloxanes as the reactants at the end of polymerization, preferably the reaction product is treated by distilling off the cyclic low-molecular siloxanes at elevated temperature and reduced pressure while passing an inert gas into the reaction product, prior to use.

[Component (H)]

Component (H) is an organopolysiloxane containing $R_3^6SiO_{1/2}$ units and $SiO_{4/2}$ units wherein $R^6$ is independently a $C_1$-$C_{10}$ monovalent hydrocarbon group free of aliphatic unsaturation or a $C_2$-$C_6$ alkenyl group, wherein a molar ratio of $R_3^6SiO_{1/2}$ units to $SiO_{4/2}$ units ranges from 0.5/1 to 1/1, preferably from 0.6/1 to 0.9/1. If the molar ratio is less than 0.5, the resulting cured product may lack adhesion or tack. If the molar ratio exceeds 1, the resulting cured product may lack adhesion or retaining force.

$R^6$ is independently a $C_1$-$C_{10}$ monovalent hydrocarbon group free of aliphatic unsaturation or a $C_2$-$C_6$ alkenyl group. Examples of the $C_1$-$C_{10}$ monovalent hydrocarbon group free of aliphatic unsaturation include $C_1$-$C_6$ alkyl groups such as methyl, ethyl, propyl and butyl and $C_6$-$C_{10}$ aryl groups such as phenyl and tolyl. Also included are $C_2$-$C_6$ alkenyl groups such as vinyl, allyl and butenyl. Of these, methyl is preferred as $R^6$.

In addition to $R^6$, component (H) may contain a silanol group and/or a hydrolyzable alkoxy group, preferably in an amount of 0.01 to 4%, more preferably 0.05 to 3.5% by weight based on the total weight of component (H). If the content of silanol or alkoxy group is less than 0.01 wt %, there may occur a loss of cohesion of PSA. A content in excess of 4 wt % may result in a loss of tack of PSA. Suitable alkoxy groups include methoxy, ethoxy, isopropoxy, butoxy and phenoxy. When the alkoxy group is contained, methoxy is preferred.

Component (H) may further contain $R^6SiO_{3/2}$ units and/or $R_2^6SiO_{2/2}$ units wherein $R^6$ is as defined above insofar as they do not adversely impact the properties of the composition. When $R^6SiO_{3/2}$ units and $R_2^6SiO_{2/2}$ units are incorporated, their content is preferably 1 to 20% by weight, more preferably 3 to 15% by weight based on the total weight of component (H).

Component (H) may be used alone or in admixture of two or more organopolysiloxanes.

Component (H) used herein may be a product obtained from condensation reaction in the presence of a catalyst.

This is an arbitrary pretreatment step wherein hydrolyzable groups available in component (H) are reacted with each other, from which effects such as improvement in adhesion are expectable. Specifically reaction is performed in the presence of an alkaline catalyst at room temperature to reflux temperature and may be followed by neutralization if necessary.

Suitable alkaline catalysts include metal hydroxides such as lithium hydroxide, sodium hydroxide, potassium hydroxide, and calcium hydroxide; carbonates such as sodium carbonate and potassium carbonate; hydrogencarbonates such as sodium hydrogencarbonate and potassium hydrogencarbonate; metal alkoxides such as sodium methoxide and potassium butoxide; organometallic compounds such as butyl lithium; potassium silanolate; and nitrogen compounds such as ammonia gas, aqueous ammonia, methylamine, trimethylamine, and triethylamine. Inter alia, ammonia gas and aqueous ammonia are preferred. The temperature of condensation reaction may range from room temperature to the reflux temperature of an organic solvent. The reaction time may be 0.5 to 20 hours, preferably 1 to 16 hours, though not particularly limited.

At the end of reaction, a neutralizing agent may be added for neutralizing the alkaline catalyst, if necessary. Suitable neutralizing agents include acidic gases such as hydrogen chloride and carbon dioxide, organic acids such as acetic acid, octylic acid, and citric acid, and mineral acids such as hydrochloric acid, sulfuric acid and phosphoric acid. Where ammonia gas, aqueous ammonia or low-boiling amine compound is used as the alkaline catalyst, an inert gas such as nitrogen may be bubbled to distill off the catalyst.

The weight ratio of component (G) to component (H), i.e., (G)/(H) ranges from 30/70 to 70/30, preferably from 32/68 to 65/35, and more preferably from 33/67 to 60/40. If component (G) is less than 30, the resulting PSA may lack release ability. If component (G) exceeds 70, the difference in release force of the PSA from the cured coatings of release agent compositions (I) and (II) for silicone PSA may become smaller.

[Component (I)]

Component (I) is an organohydrogenpolysiloxane containing at least three Si—H groups per molecule, represented by the average compositional formula (7).

Herein $R^7$ is independently a substituted or unsubstituted $C_1$-$C_{10}$ monovalent hydrocarbon group, y and z are positive numbers meeting: $y>0$, $z>0$, and $0<y+z\leq3$.

In formula (7), $R^7$ is a substituted or unsubstituted $C_1$-$C_{10}$, preferably $C_1$-$C_8$ monovalent hydrocarbon group, examples of which include alkyl groups such as methyl, ethyl, propyl and butyl, cycloalkyl groups such as cyclohexyl, alkenyl groups such as vinyl, allyl, hexenyl and octenyl, and aryl groups such as phenyl as well as substituted forms of the foregoing in which some or all carbon-bonded hydrogen atoms are substituted by halogen atoms or the like, such as trifluoromethyl and 3,3,3-trifluoropropyl. Among these, aliphatic unsaturation-free groups are preferred, and saturated aliphatic hydrocarbon groups and aromatic hydrocarbon groups are more preferred, with methyl and phenyl being most preferred.

In formula (7), y is a positive number meeting $y>0$, preferably $1\leq y<3$, z is a positive number meeting $z>0$, preferably $1\leq z<3$, and y+z is a number meeting $0<y+z\leq3$, preferably ranging from 1 to 2.

Component (I) is exemplified by those of the general formula (8), but not limited thereto.

[Chemical Formula 16]

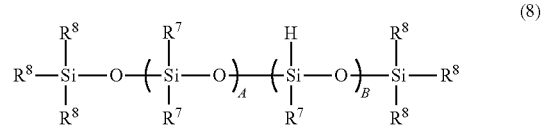

Herein $R^7$ is each independently a substituted or unsubstituted $C_1$-$C_{10}$ monovalent hydrocarbon group, $R^8$ is each independently a substituted or unsubstituted $C_1$-$C_{10}$ monovalent hydrocarbon group or hydrogen, A is an integer of 0 to 100, and B is an integer of 3 to 80.

In formula (8), $R^7$ is a substituted or unsubstituted $C_1$-$C_{10}$ monovalent hydrocarbon group. $R^8$ is a substituted or unsubstituted $C_1$-$C_{10}$ monovalent hydrocarbon group or hydrogen. Examples of the monovalent hydrocarbon groups $R^7$ and $R^8$ include alkyl groups such as methyl, ethyl, propyl and butyl, cycloalkyl groups such as cyclohexyl, alkenyl groups such as vinyl, allyl, hexenyl and octenyl, and aryl groups such as phenyl as well as substituted forms of the foregoing groups in which some or all carbon-bonded hydrogen atoms are substituted by halogen atoms or the like, such as trifluoromethyl and 3,3,3-trifluoropropyl. Preferably, $R^7$ and $R^8$ are aliphatic unsaturation-free groups, especially saturated aliphatic hydrocarbon groups or aromatic hydrocarbon groups, with methyl and phenyl being most preferred.

In formula (8), A is an integer of 0 to 100, preferably 0 to 80, and B is an integer of 3 to 80, preferably 4 to 70.

Specific structures of component (I) are shown below, but not limited thereto. In the formulae, Me stands for methyl.

[Chemical Formula 17]

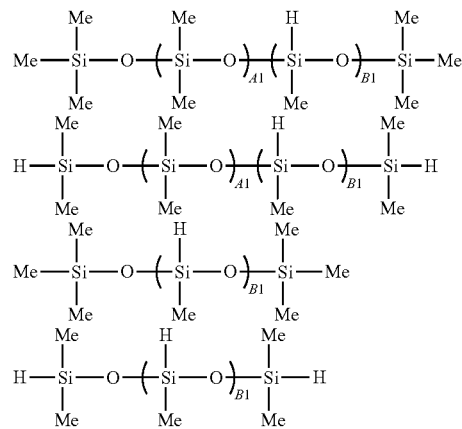

In the formulae, A1 is an integer of 0 to 100, preferably 0 to 80, and B1 is an integer of 3 to 80, preferably 4 to 70.

Component (I) is generally prepared by ring-opening polymerization of a cyclic low-molecular siloxane such as octamethylcyclotetrasiloxane and a cyclic low-molecular siloxane containing a Si—H group such as tetramethylcyclotetrasiloxane in the presence of an acid catalyst. Since the reaction product contains cyclic low-molecular siloxanes as the reactants at the end of polymerization, preferably the reaction product is treated by distilling off the cyclic low-molecular siloxanes at elevated temperature and reduced pressure while passing an inert gas into the reaction product, prior to use.

Component (I) is used in an amount to provide 0.2 to 20 moles of Si—H groups per mole of alkenyl groups in components (G) and (H). The molar ratio of Si—H/alkenyl is preferably in the range of 0.5 to 18. If the molar ratio is less than 0.2, crosslinking density may be too low to provide a cohesion and retaining force. If the molar ratio exceeds 20, crosslinking density may be too high to obtain a cured product with appropriate adhesion and tack.

[Component (J)]

Component (J) is a platinum group metal base catalyst for promoting hydrosilylation addition between alkenyl groups in components (G) and (H) and Si—H groups in component (I) for curing. Examples of the center metal of the catalyst include platinum group metals such as platinum, palladium, iridium, rhodium, osmium and ruthenium, with platinum being preferred. Suitable platinum catalysts include chloroplatinic acid, chloroplatinic acid in alcohols, reaction products of chloroplatinic acid with alcohols, reaction products of chloroplatinic acid with olefin compounds, and reaction products of chloroplatinic acid with vinyl-containing siloxanes.

Component (J) is used in an amount to give 1 to 500 ppm, preferably 2 to 450 ppm of the metal based on the total weight of components (G) to (I). Less than 1 ppm of metal may result in slow reaction and undercure, whereby the cured product may fail to exert characteristics of adhesion and retaining forces. With more than 500 ppm of metal, the cured composition may become less flexible.

[Component (K)]

Component (K) is a reaction regulator. When the silicone PSA composition is prepared or coated to a substrate, the reaction regulator serves to prevent addition reaction from starting prior to heat curing and to prevent the treatment fluid from thickening or gelling. The reaction regulator coordinates with the platinum group metal as the addition reaction catalyst to control the addition reaction, but when heated for curing, releases the coordination, allowing the catalyst to develop its activity. Any reaction regulators for the prior art addition reaction-curable silicone compositions may be used. Examples of the reaction regulator include 3-methyl-1-butyn-3-ol, 3-methyl-1-pentyn-3-ol, 3,5-dimethyl-1-hexyn-3-ol, 1-ethynylcyclohexanol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy) dimethylsilane, 1,3,5,7-tetramethyl-1,3,5,7-tetravinylcyclotetrasiloxane, 1,1,3,3-tetramethyl-1,3-divinyldisiloxane, maleic acid esters, and adipic acid esters.

When used, the reaction regulator is preferably added in an amount of 0.01 to 5 parts, more preferably 0.05 to 3 parts by weight per 100 parts by weight of components (G) to (I) combined. A less amount of the reaction regulator may fail to control the reaction, allowing the composition to cure prior to working, whereas an excessive amount may retard the reaction, resulting in undercure.

The silicone PSA composition is desirably prepared by previously mixing components (G) to (I) and (K) until uniform, and adding component (J) thereto immediately before use.

In the release force measurement, any well-known means or method for application may be used in coating the silicone PSA composition. For example, a comma coater, lip coater, roll coater, die coater, knife coater, blade coater, rod coater, kiss-roll coater, and gravure coater may be used as well as screen printing, dipping, and casting methods.

In the release force measurement, the coating weight of the silicone PSA composition is such that the cured coating has a thickness of 0.1 to 300 μm, preferably 0.5 to 200 μm. Also in the release force measurement, the curing conditions for the silicone PSA composition may be 80 to 150° C. and 10 seconds to 10 minutes.

[PSA layer]

The PSA layer is obtained by curing the silicone PSA composition defined above. In the practice of the invention, the PSA layer is preferably obtained by coating and curing the silicone PSA composition to the release agent-treated surface of the second release liner obtained by coating and curing the release agent composition (II) for silicone PSA to a substrate.

In this case, any well-known means or method for application may be used in coating the silicone PSA composition. For example, a comma coater, lip coater, roll coater, die coater, knife coater, blade coater, rod coater, kiss-roll coater, and gravure coater may be used as well as screen printing, dipping, and casting methods.

The coating weight of the silicone PSA composition may be such that the cured coating has a thickness of 0.1 to 300 μm, preferably 0.5 to 200 μm, although the coating weight is not particularly limited. The curing conditions for the silicone PSA composition may be 80 to 150° C. and 10 seconds to 10 minutes, but not limited thereto.

The release agent-treated surface of the first release liner obtained by coating and curing the release agent composition (I) for silicone PSA to a substrate is attached to the PSA-coated surface of the second release liner, yielding a laminate.

At this point, it is not particularly limited how to attach the PSA layer to the first release liner, and any load may or may not be applied after attachment. Attachment at −20° C. to 100° C., preferably at room temperature (25° C.) to 70° C. for any desired time is acceptable.

The laminate obtained by the above method may be used as a carrier-less adhesive sheet by peeling the first release liner from the laminate, attaching the PSA layer surface to an object, peeling the second release liner from this state, and attaching the opposite surface of the PSA layer to another object.

The carrier-less PSA sheet obtained by this use method may be used, for example, on cover glass and touch panels of electronic terminals such as personal computers and mobile phones, attachment of touch panels and liquid crystal panels, displays of smart phones, tablets and car navigation systems, operating terminals of ticketing machines, box type game machines, ATM, and print seal machines, remote controllers of karaoke machines, casher terminals, etc.

EXAMPLE

Examples and Comparative Examples are given below by way of illustration and not by way of limitation. In the following Examples, Me stands for methyl, Vi for vinyl, and Ph for phenyl.

[i]Examples and Comparative Examples of Release Agent Composition for Silicone PSA The release agent compositions for silicone PSA of Examples and Comparative Examples were evaluated for release force and subsequent adhesion by the following measurement methods.

<Release Force>

The release agent composition for silicone PSA was coated on a polyethylene terephthalate (PET) film of 50 μm thick by means of a wire bar in a coating weight of 0.5 g/m² as solids after curing, and air dried at 140° C. for 30 seconds to form a release liner. The release liner was cut into a release liner strip of 25 mm wide. The silicone PSA composition was coated on the cured coating surface of the release liner strip so as to give a thickness of 30 μm after curing by means of an applicator, and cured by heating at 130° C. for 1 minute, yielding a film having the PSA layer formed thereon. The PSA layer of the film was attached to a PET film of 25 μm thick. The later attached film was also, cut to a width of 25 mm corresponding to the width of the PSA layer, yielding a tape. The tape was compression bonded by moving a 2-kg roller back and forth, and aged. Using a tensile tester, a release force (X, Y) required when the 25 μm thick PET film and PSA layer was peeled from the release liner of 50 μm thick in a direction of 180° at a speed of 0.3 m/min was measured. The aging was under the following two sets of conditions.

standing at 25° C. under pressure 70 g/m² for 1 day
standing at 70° C. under pressure 20 g/m² for 7 days
<Subsequent Adhesion>

The tape (25-μm thick PET film+PSA layer) after the release force measurement (release force Y) was attached to a stainless steel plate, compression bonded by moving a 2-kg roller back and forth, and allowed to stand at room temperature for 2 hours. Using a tensile tester, a release force 1 (N/25 mm) required to peel the tape from the stainless steel plate in a direction of 180° at a speed of 0.3 m/min was measured. In another run, the silicone PSA composition was coated on a PET film of 25 μm thick and 25 mm wide so as to give a thickness of 30 μm after curing by means of an applicator, and cured by heating at 130° C. for 1 minute. The resulting PSA tape was allowed to stand for about one day. The PSA tape was attached to a stainless steel plate, compression bonded by moving a 2-kg roller back and forth, and allowed to stand at room temperature for 2 hours. Using a tensile tester, a release force 2 (N/25 mm) required to peel the PSA tape from the stainless steel plate in a direction of 180° at a speed of 0.3 m/min was measured. A value was computed according to the following formula and reported as subsequent adhesion (%).

Subsequent adhesion=(release force 1)/(release force 2)×100 (%)

Example i-1

Compound (1)-1 was prepared by mixing the following components:

55.5 parts by weight of dimethylpolysiloxane of the average compositional formula (a-1) (containing 0.28 mole of fluoroalkyl group and 0.0035 mole of vinyl group per 100 g) as component (A-1),

[Chemical Formula 18]

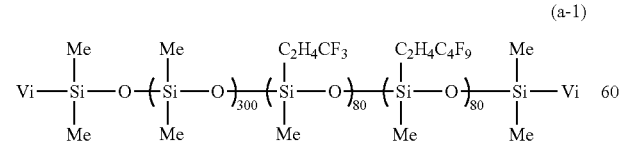

(a-1)

45.5 parts by weight of dimethylpolysiloxane of the average compositional formula (a-2) (containing 0.28 mole of fluoroalkyl group and 0.038 mole of vinyl group per 100 g) as component (A-2),

[Chemical Formula 19]

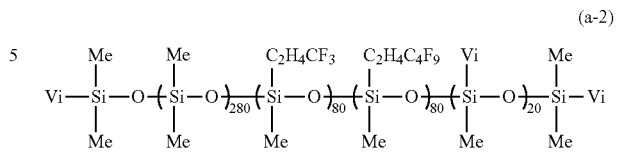

(a-2)

12.6 parts by weight of dimethylpolysiloxane of the average compositional formula (b-1) as component (B),

[Chemical Formula 20]

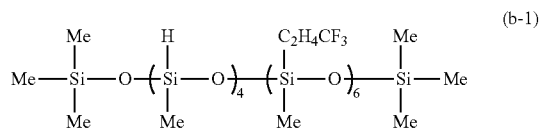

(b-1)

3 parts by weight of ethynylcyclohexanol as component (D), and
25 parts by weight of rubber solvent as component (E), wherein a molar ratio of Si—H groups in component (B) to vinyl groups in component (A) was 2.0.

Compound (II)-1 was prepared by adding 10 parts by weight of dimethylpolysiloxane of the average compositional formula (f-1) (containing 0.0025 mole of vinyl group per 100 g) as component (F),

[Chemical Formula 21]

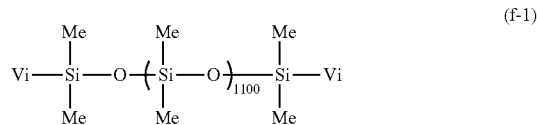

(f-1)

to Compound (I)-1 wherein a molar ratio of Si—H groups in component (B) to total vinyl groups in components (A) and (F) was 1.9.

Release agent compositions for silicone PSA were prepared by adding 5 parts by weight of a toluene solution (0.5 wt % platinum) of 1,3-divinyl-1,1,3,3-tetramethyldisiloxane-platinum(0) complex as component (C) to Compound (I)-1 or (II)-1 and diluting with a solvent mixture of hexane and methyl ethyl ketone in a weight ratio of 1:1 so as to provide a solids content of 12 wt %.

X is a release force measured on use of the release agent composition for silicone PSA containing Compound (I)-1; and Y is a release force measured on use of the release agent composition for silicone PSA containing Compound (II)-1.

A silicone PSA composition was prepared as follows.
A composition was prepared by mixing the following components:

35 parts by weight of dimethylpolysiloxane of the average compositional formula (g-1) (containing 0.0009 mole of vinyl group per 100 g) as component (G),

[Chemical Formula 22]

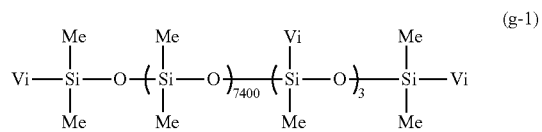

(g-1)

65 parts by weight calculated as nonvolatile of a 60 wt % toluene solution of methylpolysiloxane (h) consisting of $Me_3SiO_{1/2}$ units and $SiO_2$ units in a molar ratio $Me_3SiO_{1/2}/SiO_2$ of 0.85 as component (H), 0.23 part by weight of methylhydrogenpolysiloxane of the average compositional formula (I-1) as component (I), and

[Chemical Formula 23]

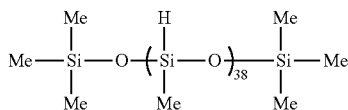

(I-1)

0.25 part by weight of ethynylcyclohexanol as component (K), and diluting with toluene to a concentration of 60 wt % of active ingredients.

To 100 parts by weight of the resulting composition, 50 parts by weight of toluene was added and further 0.5 part by weight of a toluene solution (0.5 wt % platinum) of 1,3-divinyl-1,1,3,3-tetramethyldisiloxane-platinum(0) complex as component (J) was added, yielding a silicone PSA composition wherein a molar ratio of Si—H groups in component (I) to vinyl groups in component (G) was 11.4.

Example i-2

This example was the same as in Example i-1 except that dimethylpolysiloxane of the average compositional formula (f-2) (containing 0.0036 mole of vinyl group per 100 g) was used as component (F). In composition (II), a molar ratio of Si—H groups in component (B) to total vinyl groups in components (A) and (F) was 1.9.

[Chemical Formula 24]

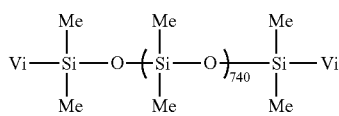

(f-2)

Example i-3

This example was the same as in Example i-1 except that dimethylpolysiloxane of the average compositional formula (f-3) (containing 0.0053 mole of vinyl group per 100 g) was used as component (F). In composition (II), a molar ratio of Si—H groups in component (B) to total vinyl groups in components (A) and (F) was 1.9.

[Chemical Formula 25]

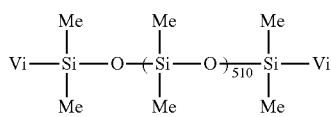

(f-3)

Example i-4

This example was the same as in Example i-1 except that dimethylpolysiloxane of the average compositional formula (f-4) (containing 0.006 mole of vinyl group per 100 g) was used as component (F). In composition (II), a molar ratio of Si—H groups in component (B) to total vinyl groups in components (A) and (F) was 1.9.

[Chemical Formula 26]

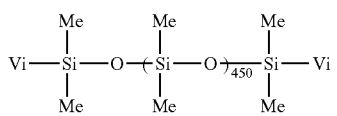

(f-4)

Example i-5

This example was the same as in Example i-1 except that dimethylpolysiloxane of the average compositional formula (f-5) (containing 0.012 mole of vinyl group per 100 g) was used as component (F). In composition (II), a molar ratio of Si—H groups in component (B) to total vinyl groups in components (A) and (F) was 1.8.

[Chemical Formula 27]

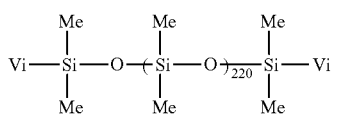

(f-5)

Example i-6

This example was the same as in Example i-1 except that dimethylpolysiloxane of the average compositional formula (f-6) (containing 0.028 mole of vinyl group per 100 g) was used as component (F). In composition (II), a molar ratio of Si—H groups in component (B) to total vinyl groups in components (A) and (F) was 1.7.

[Chemical Formula 28]

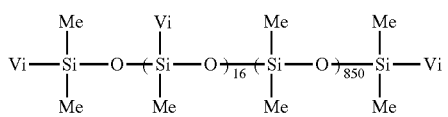

(f-6)

Example i-7

This example was the same as in Example i-1 except that dimethylpolysiloxane of the average compositional formula (f-7) (containing 0.0038 mole of vinyl group per 100 g) was used as component (F). In composition (II), a molar ratio of Si—H groups in component (B) to total vinyl groups in components (A) and (F) was 1.9.

[Chemical Formula 29]

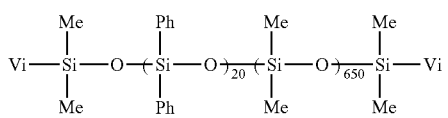

(f-7)

Example i-8

This example was the same as in Example i-2 except that the amount of dimethylpolysiloxane of formula (f-2) added as component (F) was changed to 5 parts by weight. In composition (II), a molar ratio of Si—H groups in component (B) to total vinyl groups in components (A) and (F) was 1.9.

Example i-9

This example was the same as in Example i-2 except that the amount of dimethylpolysiloxane of formula (f-2) added as component (F) was changed to 7.5 parts by weight. In composition (II), a molar ratio of Si—H groups in component (B) to total vinyl groups in components (A) and (F) was 1.9.

Example i-10

This example was the same as in Example i-2 except that the amount of dimethylpolysiloxane of formula (f-2) added as component (F) was changed to 15 parts by weight. In composition (II), a molar ratio of Si—H groups in component (B) to total vinyl groups in components (A) and (F) was 1.9.

Example i-11

This example was the same as in Example i-2 except that the amount of dimethylpolysiloxane of formula (f-2) added as component (F) was changed to 20 parts by weight. In composition (II), a molar ratio of Si—H groups in component (B) to total vinyl groups in components (A) and (F) was 1.9.

Comparative Example i-1

Compound (I)-2 was prepared by mixing the following components:

55.5 parts by weight of dimethylpolysiloxane of the average compositional formula (a-3) (containing 0.078 mole of fluoroalkyl group and 0.0052 mole of vinyl group per 100 g) as component (A-1),

[Chemical Formula 30]

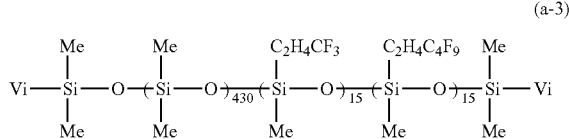

(a-3)

45.5 parts by weight of dimethylpolysiloxane of the average compositional formula (a-4) (containing 0.077 mole of fluoroalkyl group and 0.057 mole of vinyl group per 100 g) as component (A-2),

[Chemical Formula 31]

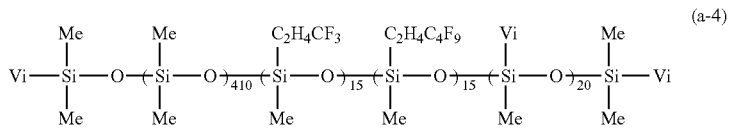

(a-4)

19.3 parts by weight of dimethylpolysiloxane of the average compositional formula (b) as component (B),

[Chemical Formula 32]

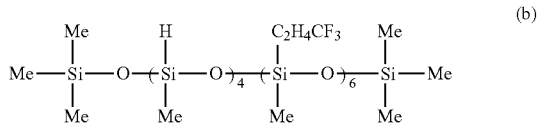

(b)

3 parts by weight of ethynylcyclohexanol as component (D), and 25 parts by weight of rubber solvent as component (E), wherein a molar ratio of Si—H groups in component (B) to vinyl groups in component (A) was 2.0.

A release agent composition for silicone PSA was prepared by adding 5 parts by weight of a toluene solution (0.5 wt % platinum) of 1,3-divinyl-1,1,3,3-tetramethyldisiloxane-platinum(0) complex as component (C) to Compound (I)-2 and diluting with a solvent mixture of hexane and methyl ethyl ketone in a weight ratio of 1:1 so as to provide a solids content of 12 wt %.

Y is a release force measured on use of this release agent composition while X is a release force measured on use of the release agent composition for silicone PSA containing Compound (1)-1 as in Example i-1.

Comparative Example i-2

This example was the same as in Example i-1 except that dimethylpolysiloxane of the average compositional formula (f-8) (containing 0.12 mole of fluoroalkyl group and 0.0081 mole of vinyl group per 100 g) was used as component (F). In composition (II), a molar ratio of Si—H groups in component (B) to total vinyl groups in components (A) and (F) was 1.9.

[Chemical Formula 33]

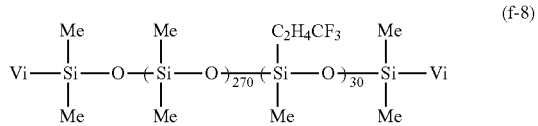

(f-8)

Comparative Example i-3

This example was the same as in Example i-1 except that dimethylpolysiloxane of the average compositional formula (f-9) (0 mole of vinyl group per 100 g) was used as component (F). In composition (II), a molar ratio of Si—H groups in component (B) to vinyl groups in component (A) was 2.0.

[Chemical Formula 34]

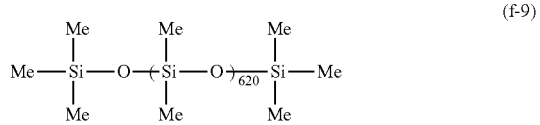

(f-9)

Comparative Example i-4

This example was the same as in Example i-1 except that dimethylpolysiloxane of formula (b) was used as component (F). In composition (II), a molar ratio of total Si—H groups in components (B) and (F) to vinyl groups in component (A) was 3.5.

Comparative Example i-5

This example was the same as in Example i-1 except that dimethylpolysiloxane of formula (h) was used as component (F). In composition (II), a molar ratio of Si—H groups in component (B) to vinyl groups in component (A) was 2.0.

was added as component (F) required a release force which was at least 1.5 times greater than the release force for the composition prior to the addition and even at least 9 times under certain conditions. Although it is possible to synthesize a new fluorine base material and evaluate the material for release, the invention is quite advantageous in view of cost and working time in that the variation of release force can be increased simply by adding the existing inexpensive material. Any of various (fluoroalkyl-free) alkenyl-containing organopolysiloxanes may be used as component (F), and the release force may be controlled by changing the addition amount.

It is evident from the results of Comparative Example i-1 that with a lower content of fluoroalkyl group, peeling is difficult after the release agent composition is attached to PSA under heat application.

In Comparative Examples i-2 to i-5, release tightening was investigated using various additives.

No release tightening effect was obtained when fluoroalkyl-containing dimethylpolysiloxane of formula (f-8) was added (Comparative Example i-2).

Also, no release tightening was achieved when alkenyl-free dimethylpolysiloxane of formula (f-9) was added. Since the subsequent adhesion was low, it was believed that some components migrated to the PSA (Comparative Example i-3).

Another release tightening attempt was made by adding dimethylpolysiloxane of formula (b) to increase the amount of residual Si—H groups, but its effect was limited (Comparative Example i-4).

TABLE 1

|  |  |  | Standing at 25° C. under pressure 70 g/m² for 1 day | | | | Standing at 70° C. under pressure 20 g/m² for 7 days | | | |
|---|---|---|---|---|---|---|---|---|---|---|
|  |  | Component (F) | Release force Y (N/25 mm) | Release force X (N/25 mm) | Y/X | Subsequent adhesion (%) | Release force Y (N/25 mm) | Release force X (N/25 mm) | Y/X | Subsequent adhesion (%) |
| Example | i-1 | (f-1) 10 pbw | 0.32 | 0.12 | 2.67 | 90 | 0.34 | 0.11 | 3.09 | 97 |
|  | i-2 | (f-2) 10 pbw | 0.42 | 0.12 | 3.50 | 90 | 0.34 | 0.11 | 3.09 | 95 |
|  | i-3 | (f-3) 10 pbw | 0.32 | 0.12 | 2.67 | 93 | 0.25 | 0.11 | 2.27 | 93 |
|  | i-4 | (f-4) 10 pbw | 0.24 | 0.12 | 2.00 | 92 | 0.19 | 0.11 | 1.73 | 93 |
|  | i-5 | (f-5) 10 pbw | 0.24 | 0.12 | 2.00 | 97 | 0.21 | 0.11 | 1.91 | 98 |
|  | i-6 | (f-6) 10 pbw | 0.27 | 0.12 | 2.25 | 95 | 0.24 | 0.11 | 2.18 | 96 |
|  | i-7 | (f-7) 10 pbw | 0.26 | 0.12 | 2.17 | 98 | 0.25 | 0.11 | 2.27 | 99 |
|  | i-8 | (f-2) 5 pbw | 0.20 | 0.12 | 1.67 | 95 | 0.17 | 0.11 | 1.55 | 92 |
|  | i-9 | (f-2) 7.5 pbw | 0.35 | 0.12 | 2.92 | 93 | 0.34 | 0.11 | 3.09 | 90 |
|  | i-10 | (f-2) 15 pbw | 0.45 | 0.12 | 3.75 | 100 | 0.68 | 0.11 | 6.18 | 99 |
|  | i-11 | (f-2) 20 pbw | 0.54 | 0.12 | 4.50 | 101 | 1.07 | 0.11 | 9.73 | 96 |
| Comparative Example | i-1 | — | 3.21 | 0.12 | 26.75 | 85 | * | 0.11 | — | — |
|  | i-2 | (f-8) 10 pbw | 0.14 | 0.12 | 1.17 | 96 | 0.14 | 0.11 | 1.27 | 99 |
|  | i-3 | (f-9) 10 pbw | 0.11 | 0.12 | 0.92 | 81 | 0.12 | 0.11 | 1.09 | 83 |
|  | i-4 | (b) 10 pbw | 0.13 | 0.12 | 1.08 | 97 | 0.15 | 0.11 | 1.36 | 93 |
|  | i-5 | (h) 10 pbw | * | 0.12 | — | — | * | 0.11 | — | — |

* not accurately measured because continuous peeling was impossible and zipping with tingling noise occurred.

As seen from Table 1, Examples i-1 to i-11 in which fluoroalkyl-free, alkenyl-containing organopolysiloxane Methylpolysiloxane of formula (h) is a tackifier for silicone PSA compositions and is sometimes used as a release tightening component. However, it is inadequate because zipping occurred when added (Comparative Example i-5).

(ii) Examples and Comparative Examples of Laminate

The release agent compositions for silicone PSA of Examples and Comparative Examples were evaluated for release force, a deformation of PSA layer, and Adhesion by the following methods.

<Release Force 1 of Release Agent Composition (I) for Silicone PSA>

The release agent composition (I) for silicone PSA was coated on a polyethylene terephthalate (PET) film of 50 μm thick by means of a wire bar in a coating weight of 0.5 g/m² as solids after curing, and air dried at 140° C. for 30 seconds to form a release liner. Separately, the silicone PSA composition was coated on a PET film of 25 μm thick so as to give a thickness of 30 μm after curing by means of an applicator, and cured by heating at 130° C. for 1 minute, yielding a film having the PSA layer formed thereon. The PSA layer of the film was attached to the cured coating surface of the release liner. The laminate was cut into a tape of 25 mm wide. The tape was compression bonded by moving a 2-kg roller back and forth, and aged. Using a tensile tester, a release force required when the 25-μm thick PET film and PSA layer was peeled from the release liner of 50 μm thick in a direction of 180° at a speed of 0.3 m/min was measured. The aging was under the following two sets of conditions.

standing at 25° C. under pressure 70 g/m² for 1 day
standing at 70° C. under pressure 20 g/m² for 7 days <Release Force 2 of Release Agent Composition (II) for Silicone PSA>

The release agent composition (II) for silicone PSA was coated on a PET film of 50 thick by means of a wire bar in a coating weight of 0.5 g/m² as solids after curing, and air dried at 140° C. for 30 seconds to form a release liner. The release liner was cut into a release liner strip of 25 mm wide. The silicone PSA composition was coated on the cured coating surface of the release liner strip so as to give a thickness of 30 μm after curing by means of an applicator, and cured by heating at 130° C. for 1 minute, yielding a film having the PSA layer formed thereon. The PSA layer of the film was attached to a PET film of 25 μm thick. The later attached film was also cut to a width of 25 mm corresponding to the width of the PSA layer, yielding a tape. The tape was compression bonded by moving a 2-kg roller back and forth, and aged. Using a tensile tester, a release force required when the 25-μm thick PET film and PSA layer was peeled from the release liner of 50 μm thick in a direction of 180° at a speed of 0.3 m/min was measured. The aging was under the following two sets of conditions.

standing at 25° C. under pressure 70 g/m² for 1 day
standing at 70° C. under pressure 20 g/m² for 7 days <Occurrence of deformation of PSA layer>

The release agent composition (II) for silicone PSA was coated on a PET film of 50 μm thick by means of a wire bar in a coating weight of 0.5 g/m² as solids after curing, and air dried at 140° C. for 30 seconds to form a second release liner. The second release liner was cut to a width of 25 mm. The silicone PSA composition was coated on the cured coating surface of the release liner strip so as to give a thickness of 30 μm after curing by means of an applicator, and cured by heating at 130° C. for 1 minute, yielding a film having the PSA layer formed thereon. Separately, the release agent composition (I) for silicone PSA was coated on a PET film of 50 μm thick by means of a wire bar in a coating weight of 0.5 g/m² as solids after curing, and air dried at 140° C. for 30 seconds to form a first release liner. The cured coating surface of the first release liner was attached to the PSA layer of the film having the PSA layer formed thereon, and cut to a width of 25 mm, yielding a laminate containing the PSA layer. It was visually observed whether or not a deformation of PSA layer occurred when the first release liner treated with the release agent composition (I) for silicone PSA was peeled from the laminate.

O: no deformation of PSA layer occurred
X: deformation of PSA layer t occurred

<Adhesion>

The film having the PSA layer, which was peeled in the measurement of release force 2, was attached to a stainless steel plate. The assembly was compression bonded by moving a 2-kg roller back and forth, and allowed to stand at room temperature for 2 hours. Using a tensile tester, a force required when the film having PSA layer was peeled from the stainless steel plate in a direction of 180° at a speed of 0.3 m/min was measured and reported as adhesion (N/25 mm).

Example ii-1

Compound (I-1) was prepared by mixing the following components:

55.5 parts by weight of dimethylpolysiloxane of the average compositional formula (a-1) (containing 0.28 mole of fluoroalkyl group and 0.0035 mole of vinyl group per 100 g) as component (A-1),

[Chemical Formula 35]

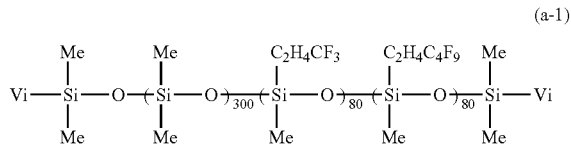

(a-1)

45.5 parts by weight of dimethylpolysiloxane of the average compositional formula (a-2) (containing 0.28 mole of fluoroalkyl group and 0.038 mole of vinyl group per 100 g) as component (A-2),

[Chemical Formula 36]

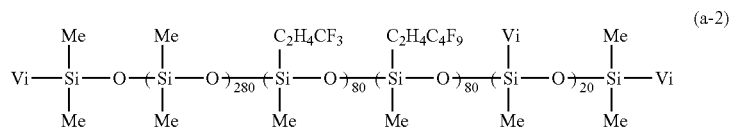

(a-2)

12.6 parts by weight of dimethylpolysiloxane of the average compositional formula (b-1) as component (B),

[Chemical Formula 37]

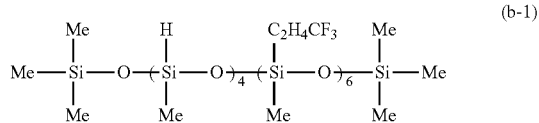
(b-1)

3 parts by weight of ethynylcyclohexanol as component (D), and 25 parts by weight of rubber solvent as component (E), wherein a molar ratio of Si—H groups in component (B) to vinyl groups in component (A) was 2.0.

Compound (II-1) was prepared by adding 10 parts by weight of dimethylpolysiloxane of the average compositional formula (f-1) (containing 0.0025 mole of vinyl group per 100 g) as component (F),

[Chemical Formula 38]

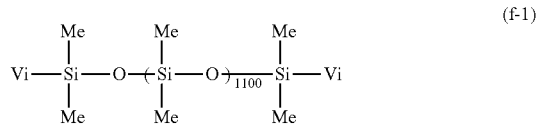
(f-1)

to Compound (I-1) wherein a molar ratio of Si—H groups in component (B) to total vinyl groups in components (A) and (F) was 1.9.

Release agent compositions (I) and (II) for silicone PSA were prepared by adding 5 parts by weight of a toluene solution (0.5 wt % platinum) of 1,3-divinyl-1,1,3,3-tetramethyldisiloxane-platinum(0) complex as component (C) to Compound (I-1) or (II-1) and diluting with a solvent mixture of hexane and methyl ethyl ketone in a weight ratio of 1:1 so as to provide a solids content of 12 wt %.

The release force 1 was measured using the release agent composition (I) for silicone PSA, and the release force 2 was measured using the release agent composition (II) for silicone PSA, after which the adhesion was determined. Using the release agent compositions (I) and (II) for silicone PSA, it was confirmed whether or not the deformation of PSA layer occurred.

Notably, a silicone PSA composition was prepared as follows.

A composition was prepared by mixing the following components:

35 parts by weight of dimethylpolysiloxane of the average compositional formula (g-1) (containing 0.0009 mole of vinyl group per 100 g) as component (G),

[Chemical Formula 39]

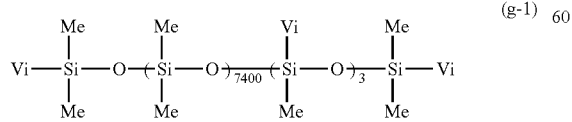
(g-1)

65 parts by weight calculated as nonvolatile of a 60 wt % toluene solution of methylpolysiloxane (h) consisting of Me$_3$SiO$_{1/2}$ units and SiO$_2$ units in a molar ratio Me$_3$SiO$_{1/2}$/SiO$_2$ of 0.85 as component (H), 0.23 part by weight of methylhydrogenpolysiloxane of the average compositional formula (I-1) as component (I), and

[Chemical Formula 40]

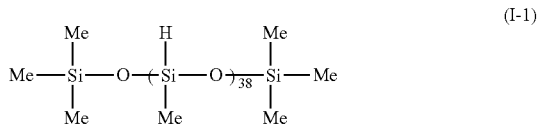
(I-1)

0.25 part by weight of ethynylcyclohexanol as component (K), and diluting with toluene to a concentration of 60 wt % of active ingredients.

To 100 parts by weight of the resulting composition, 50 parts by weight of toluene was added and further 0.5 part by weight of a toluene solution (0.5 wt % platinum) of 1,3-divinyl-1,1,3,3-tetramethyldisiloxane-platinum(0) complex as component (J) was added, yielding a silicone PSA composition wherein a molar ratio of Si—H groups in component (I) to vinyl groups in component (G) was 11.4.

Example ii-2

This example was the same as in Example ii-1 except that dimethylpolysiloxane of the average compositional formula (f-2) (containing 0.0036 mole of vinyl group per 100 g) was used as component (F). In release agent composition (II) for silicone PSA, a molar ratio of Si—H groups in component (B) to total vinyl groups in components (A) and (F) was 1.9.

[Chemical Formula 41]

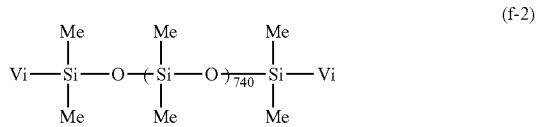
(f-2)

Example ii-3

This example was the same as in Example ii-1 except that dimethylpolysiloxane of the average compositional formula (f-3) (containing 0.0053 mole of vinyl group per 100 g) was used as component (F). In release agent composition (II) for silicone PSA, a molar ratio of Si—H groups in component (B) to total vinyl groups in components (A) and (F) was 1.9.

[Chemical Formula 42]

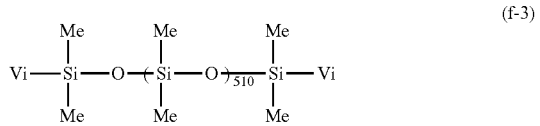
(f-3)

Example ii-4

This example was the same as in Example ii-1 except that dimethylpolysiloxane of the average compositional formula (f-4) (containing 0.006 mole of vinyl group per 100 g) was used as component (F). In release agent composition (II) for silicone PSA, a molar ratio of Si—H groups in component (B) to total vinyl groups in components (A) and (F) was 1.9.

[Chemical Formula 43]

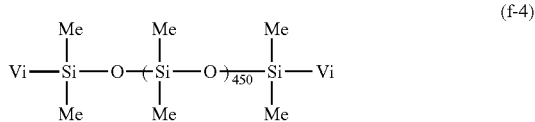

(f-4)

Example ii-5

This example was the same as in Example ii-1 except that dimethylpolysiloxane of the average compositional formula (f-5) (containing 0.012 mole of vinyl group per 100 g) was used as component (F). In release agent composition (II) for silicone PSA, a molar ratio of Si—H groups in component (B) to total vinyl groups in components (A) and (F) was 1.8.

[Chemical Formula 44]

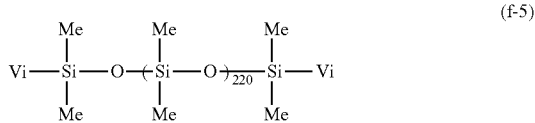

(f-5)

Example ii-6

This example was the same as in Example ii-1 except that dimethylpolysiloxane of the average compositional formula (f-6) (containing 0.028 mole of vinyl group per 100 g) was used as component (F). In release agent composition (II) for silicone PSA, a molar ratio of Si—H groups in component (B) to total vinyl groups in components (A) and (F) was 1.7.

[Chemical Formula 45]

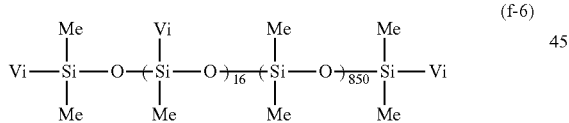

(f-6)

Example ii-7

This example was the same as in Example ii-1 except that dimethylpolysiloxane of the average compositional formula (f-7) (containing 0.0038 mole of vinyl group per 100 g) was used as component (F). In release agent composition (II) for silicone PSA, a molar ratio of Si—H groups in component (B) to total vinyl groups in components (A) and (F) was 1.9.

[Chemical Formula 46]

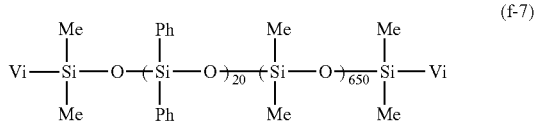

(f-7)

Example ii-8

This example was the same as in Example ii-2 except that the amount of dimethylpolysiloxane of formula (f-2) added as component (F) was changed to 5 parts by weight. In release agent composition (II) for silicone PSA, a molar ratio of Si—H groups in component (B) to total vinyl groups in components (A) and (F) was 1.9.

Example ii-9

This example was the same as in Example ii-2 except that the amount of dimethylpolysiloxane of formula (f-2) added as component (F) was changed to 7.5 parts by weight. In release agent composition (II) for silicone PSA, a molar ratio of Si—H groups in component (B) to total vinyl groups in components (A) and (F) was 1.9.

Example ii-10

This example was the same as in Example ii-2 except that the amount of dimethylpolysiloxane of formula (f-2) added as component (F) was changed to 15 parts by weight. In release agent composition (II) for silicone PSA, a molar ratio of Si—H groups in component (B) to total vinyl groups in components (A) and (F) was 1.9.

Example ii-11

This example was the same as in Example ii-2 except that the amount of dimethylpolysiloxane of formula (f-2) added as component (F) was changed to 20 parts by weight. In release agent composition (II) for silicone PSA, a molar ratio of Si—H groups in component (B) to total vinyl groups in components (A) and (F) was 1.9.

Comparative Example ii-1

The release forces 1 and 2 were measured as in Example 1, using the release agent composition (I) for silicone PSA not containing component (F), that is, the release agent composition (I) for silicone PSA instead of the release agent composition (II) for silicone PSA. Thereafter, the adhesion was determined, and it was confirmed whether or not a deformation of PSA layer occurred.

Comparative Example ii-2

This example was the same as in Example ii-1 except that dimethylpolysiloxane of the average compositional formula (f-8) (containing 0.12 mole of fluoroalkyl group and 0.0081 mole of vinyl group per 100 g) was used as component (F). In release agent composition (II) for silicone PSA, a molar ratio of Si—H groups in component (B) to total vinyl groups in components (A) and (F) was 1.9.

[Chemical Formula 47]

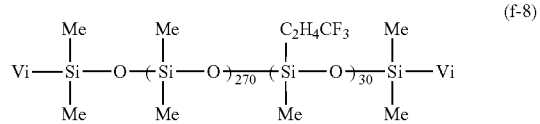

(f-8)

Comparative Example ii-3

This example was the same as in Example ii-1 except that dimethylpolysiloxane of the average compositional formula (f-9) (0 mole of vinyl group per 100 g) was used as component (F). In release agent composition (II) for silicone PSA, a molar ratio of Si—H groups in component (B) to vinyl groups in component (A) was 2.0.

[Chemical Formula 48]

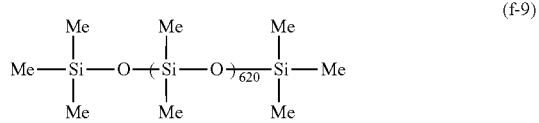

(f-9)

Comparative Example ii-4

This example was the same as in Example ii-1 except that dimethylpolysiloxane of formula (b-1) was used as component (F). In release agent composition (II) for silicone PSA, a molar ratio of total Si—H groups in components (B) and (F) to vinyl groups in component (A) was 3.5.

Comparative Example ii-5

This example was the same as in Example ii-1 except that dimethylpolysiloxane of formula (h) was used as component (F). In release agent composition (II) for silicone PSA, a molar ratio of Si—H groups in component (B) to vinyl groups in component (A) was 2.0.

Comparative Example ii-6

The release forces 1 and 2 were measured using the release liners prepared using the release agent composition 1a described in JP 5553395, after which the adhesion was determined. It was confirmed whether or not the deformation of PSA layer occurred. Specifically, a release agent composition for silicone PSA was prepared by mixing 9.73 parts by weight of dimethylpolysiloxane having the formula (a-3),

[Chemical Formula 49]

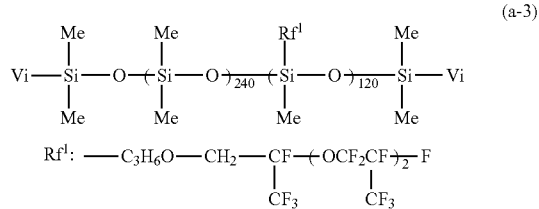

(a-3)

0.27 part by weight of dimethylpolysiloxane having the formula (b-2) wherein a molar ratio of Si—H groups in component (b-2) to vinyl groups in component (a-3) was 2.0,

[Chemical Formula 50]

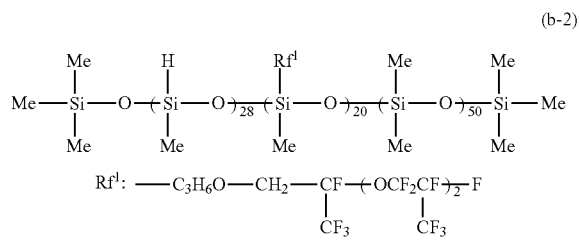

(b-2)

0.02 part by weight of 3-methyl-1-butyn-3-ol, 190 parts by weight of m-xylene hexafluoride, and an amount of chloroplatinic acid/vinylsiloxane complex salt to give 30 ppm of platinum metal based on the weight of component (a-3). The composition was coated on a PET film of 50 μm thick by means of a wire bar in a coating weight of 0.2 g/m² as solids after curing, and air dried at 150° C. for 1 minute to form a release liner.

Comparative Example ii-7

The release forces 1 and 2 were measured using the release liners prepared using the release agent composition 1b described in JP 5553395, after which the adhesion was determined. It was confirmed whether or not the deformation of PSA layer occurred. Specifically, a release agent composition for silicone PSA was prepared by mixing 9.06 parts by weight of dimethylpolysiloxane having the formula (a-4),

[Chemical Formula 51]

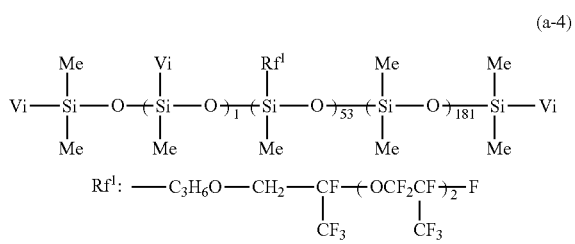

(a-4)

0.94 part by weight of dimethylpolysiloxane having the formula (b-2) wherein a molar ratio of Si—H groups in component (b-2) to vinyl groups in component (a-4) was 2.5,

[Chemical Formula 52]

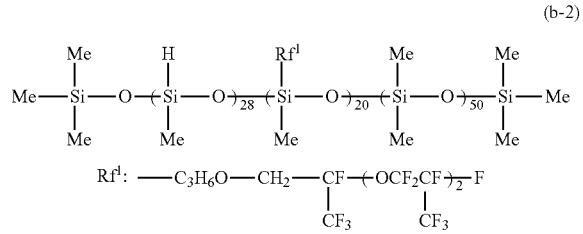

(b-2)

0.02 part by weight of 3-methyl-1-butyn-3-ol, 190 parts by weight of diisopropyl ether, and an amount of chloroplatinic acid/vinylsiloxane complex salt to give 30 ppm of platinum metal based on the weight of component (a-3). The composition was coated on a PET film of 50 μm thick by means of a wire bar in a coating weight of 0.2 g/m² as solids after curing, and air dried at 150° C. for 1 minute to form a release liner.

TABLE 2

| | | Component (F) in release agent composition (II) for silicone PSA | Standing at 25° C. under pressure 70 g/m² for 1 day | | | | Standing at 70° C. under pressure 20 g/m² for 7 days | | | |
|---|---|---|---|---|---|---|---|---|---|---|
| | | | Release force 1 (N/25 mm) | Release force 2 (N/25 mm) | Deformation of PSA layer | Adhesion (N/25 mm) | Release force 1 (N/25 mm) | Release force 2 (N/25 mm) | Deformation of PSA layer | Adhesion (N/25 mm) |
| Example | ii-1 | (f-1) 10 pbw | 0.05 | 0.32 | ○ | 12.0 | 0.07 | 0.34 | ○ | 12.8 |
| | ii-2 | (f-2) 10 pbw | 0.05 | 0.42 | ○ | 11.8 | 0.07 | 0.34 | ○ | 12.5 |
| | ii-3 | (f-3) 10 pbw | 0.05 | 0.32 | ○ | 12.2 | 0.07 | 0.25 | ○ | 12.2 |
| | ii-4 | (f-4) 10 pbw | 0.05 | 0.24 | ○ | 12.0 | 0.07 | 0.19 | ○ | 12.1 |
| | ii-5 | (f-5) 10 pbw | 0.05 | 0.24 | ○ | 12.5 | 0.07 | 0.21 | ○ | 12.9 |
| | ii-6 | (f-6) 10 pbw | 0.05 | 0.27 | ○ | 12.6 | 0.07 | 0.24 | ○ | 12.7 |
| | ii-7 | (f-7) 10 pbw | 0.05 | 0.26 | ○ | 12.6 | 0.07 | 0.25 | ○ | 12.7 |
| | ii-8 | (f-2) 5 pbw | 0.05 | 0.20 | ○ | 12.8 | 0.07 | 0.17 | ○ | 12.4 |
| | ii-9 | (f-2) 7.5 pbw | 0.05 | 0.35 | ○ | 12.5 | 0.07 | 0.34 | ○ | 12.1 |
| | ii-10 | (f-2) 15 pbw | 0.05 | 0.45 | ○ | 12.2 | 0.07 | 0.68 | ○ | 12.7 |
| | ii-11 | (f-2) 20 pbw | 0.05 | 0.54 | ○ | 12.8 | 0.07 | 1.07 | ○ | 12.6 |
| Comparative Example | ii-1 | none | 0.05 | 0.14 | X | 12.4 | 0.07 | 0.12 | X | 12.6 |
| | ii-2 | (f-8) 10 pbw | 0.05 | 0.14 | X | 12.5 | 0.07 | 0.14 | X | 12.5 |
| | ii-3 | (f-9) 10 pbw | 0.05 | 0.11 | X | 10.2 | 0.07 | 0.12 | X | 10.0 |
| | ii-4 | (b-1) 10 pbw | 0.05 | 0.13 | X | 12.2 | 0.07 | 0.15 | X | 11.8 |
| | ii-5 | (h) 10 pbw | 0.05 | * | — | — | 0.07 | * | — | — |
| | ii-6 | — | 0.03 | 0.10 | ○ | 12.2 | 0.07 | 0.13 | X | 11.9 |
| | ii-7 | — | 0.05 | 0.18 | ○ | 12.0 | 0.12 | 0.21 | X | 12.3 |

* not accurately measured because continuous peeling was impossible and zipping with tingling noise occurred.

As seen from Table 2, Examples ii-1 to ii-11 in which the substrate was treated with the composition having component (F) added thereto as the release agent composition (II) for silicone PSA required a release force which was greater than the release force for the substrate treated with the release agent composition (I-1) for silicone PSA, thus preventing a deformation of PSA layer from occurring when the one (first) release liner was peeled. This enabled that the PSA layer was attached to an adherend, after which the other (second) release liner was peeled, yielding a substrate-less silicone adhesive sheet. It was also confirmed that the PSA layer maintained satisfactory adhesiveness even after the release liner treated with the release agent composition (II) for silicone PSA was peeled off.

In Comparative Example ii-1, a deformation of PSA layer occurred due to a small difference in release force between the two release liners because the same release agent composition for silicone PSA was used.

In Comparative Examples ii-2 to ii-5, how to increase the difference in release force was investigated using various additives. When fluoroalkyl-containing dimethylpolysiloxane of formula (f-8) was added (Comparative Example ii-2), the difference in release force between the two release liners could not be increased and a deformation of PSA layer occurred. Also, a deformation of PSA layer occurred when alkenyl-free dimethylpolysiloxane of formula (f-9) was added (Comparative Example ii-3).

Another attempt to increase the difference in release force was made by adding dimethylpolysiloxane of formula (b-1) to increase the amount of residual Si—H groups, but its effect was limited (Comparative Example ii-4).

Methylpolysiloxane of formula (h) is a tackifier for silicone PSA compositions and is sometimes used as a release tightening component. However, it is inadequate because zipping occurred when added (Comparative Example ii-5).

In Comparative Examples ii-6 and ii-7, no deformation of PSA layer occurred from attachment at room temperature because of a substantial difference in release force, but in the case of attachment under heating, a deformation of PSA layer occurred because the difference in release force was reduced.

The invention claimed is:

1. A release agent composition for silicone pressure-sensitive adhesives, comprising
 (A) 100 parts by weight of an organopolysiloxane having the average compositional formula (1):

[Chemical Formula 1]

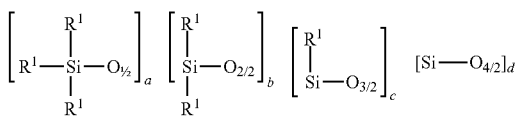

(1)

wherein R¹ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups R¹ containing a $C_2$-$C_{10}$ alkenyl-containing organic group, at least one of groups R¹ containing a $C_1$-$C_{10}$ fluoroalkyl group, a is an integer of at least 2, b is an integer of at least 1, c and d each are is an integer of at least 0, 50≤a+b+c+d≤5,000, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups, (B) an organohydrogenpolysiloxane having at least three Si—H groups per molecule, in such an amount as to give 1 to 10 moles of Si—H groups per mole of total alkenyl groups in components (A) and (F), (C) a platinum group metal base catalyst for promoting hydrosilylation between alkenyl groups in components (A) and (F) and Si—H groups in component (B) for curing, in such an amount as to give 1 to 500 ppm of the metal based on the weight of component (A), (E) 0 to 2,000 parts by weight of an organic solvent, and (F) 1 to 25 parts by weight of an organopolysiloxane containing 0.001 to 0.1 mole per 100 g of alkenyl groups and being free of fluoroalkyl groups, wherein component (A) comprises:

(A-1) an organopolysiloxane having at least two alkenyl-containing organic groups and at least one fluoroalkyl group per molecule, and containing 0.001 to less than 0.03 mole per 100 g of alkenyl groups and 0.1 to 0.5 mole per 100 g of fluoroalkyl groups; and (A-2) an organopolysiloxane having at least two alkenyl-containing organic groups and at least one fluoroalkyl group per molecule, and containing 0.03 to 0.5 mole per 100 g of alkenyl groups and 0.1 to 0.5 mole per 100 g of fluoroalkyl groups, and wherein a ratio of component (A-1) to component (A-2) is from 20:80 to 80:20 in weight ratio.

2. The release agent composition for silicone pressure-sensitive adhesives of claim 1, further comprising (D) 0.01 to 5 parts by weight of a reaction regulator per 100 parts by weight of component (A).

3. The release agent composition for silicone pressure-sensitive adhesives of claim 1, wherein the fluoroalkyl group in component (A) is selected from the group consisting of 3,3,3-trifluoropropyl, 3,3,4,4,4-pentafluorobutyl, 3,3,4,4,5,5,5-heptafluoropentyl, 3,3,4,4,5,5,6,6,6-nonafluorohexyl, 3,3,4,4,5,5,6,6,7,7,7-undecafluoroheptyl, 3,3,4,4,5,5,6,6,7,7,8,8,8-tridecafluorooctyl, and 3,3,4,4,5,5,6,6,7,7,8,8,9,9,9-pentadecafluorononyl.

4. The release agent composition for silicone pressure-sensitive adhesives of claim 1, wherein component (B) contains a fluoroalkyl group.

5. The release agent composition for silicone pressure-sensitive adhesives of claim 4, wherein the fluoroalkyl group in component (B) is 3,3,3-trifluoropropyl.

6. A release liner comprising a plastic film treated with the release agent composition for silicone pressure-sensitive adhesives of claim 1.

7. A laminate of a structure comprising
a first release liner,
a pressure-sensitive adhesive layer, and
a second release liner, stacked in the described order, wherein a release surface of the first release liner (disposed in contact with the pressure-sensitive adhesive layer) is treated with a release agent composition (I) for silicone pressure-sensitive adhesives comprising the following components (A) to (C) and optional component (E), and a release surface of the second release liner (disposed in contact with the pressure-sensitive adhesive layer) is treated with a release agent composition (II) for silicone pressure-sensitive adhesives comprising the following components (A) to (C), (F) and optional component (E), (A) 100 parts by weight of an organopolysiloxane having the average compositional formula (1):

[Chemical Formula 2]

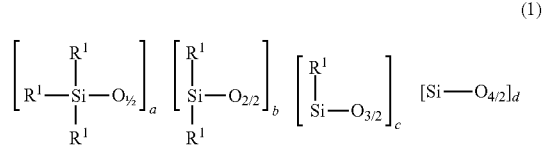

wherein R¹ which may be the same or different is a substituted or unsubstituted $C_1$-$C_{10}$ monovalent hydrocarbon group free of aliphatic unsaturation or a $C_2$-$C_{10}$ alkenyl-containing organic group, at least two of groups R¹ containing a $C_2$-$C_{10}$ alkenyl-containing organic group, at least one of groups R¹ containing a $C_1$-$C_{10}$ fluoroalkyl group, a is an integer of at least 2, b is an integer of at least 1, c and d each are is an integer of at least 0, 50 ≤a+b+c+d≤5,000, the organopolysiloxane having at least two alkenyl-containing organic groups and at least one fluoroalkyl group per molecule, and containing 0.001 to 0.5 mole per 100 g of alkenyl groups and 0.1 to 0.5 mole per 100 g of fluoroalkyl groups, (B) an organohydrogenpolysiloxane having at least three Si—H groups per molecule, in such an amount as to give 1 to 10 moles of Si—H groups per mole of total alkenyl groups in components (A) and (F), (C) a platinum group metal base catalyst for promoting hydrosilylation between alkenyl groups in components (A) and (F) and Si—H groups in component (B) for curing, in such an amount as to give 1 to 500 ppm of the metal based on the weight of component (A), (E) 0 to 2,000 parts by weight of an organic solvent, and (F) 1 to 25 parts by weight of an organopolysiloxane containing 0.001 to 0.1 mole per 100 g of alkenyl groups and being free of fluoroalkyl groups wherein component (A) comprises:

(A-1) an organopolysiloxane having at least two alkenyl-containing organic groups and at least one fluoroalkyl group per molecule, and containing 0.001 to less than 0.03 mole per 100 g of alkenyl groups and 0.1 to 0.5 mole per 100 g of fluoroalkyl groups; and (A-2) an organopolysiloxane having at least two alkenyl-containing organic groups and at least one fluoroalkyl group per molecule, and containing 0.03 to 0.5 mole per 100 g of alkenyl groups and 0.1 to 0.5 mole per 100 g of fluoroalkyl groups, and wherein a ratio of component (A-1) to component (A-2) is from 20:80 to 80:20 in weight ratio.

8. The laminate of claim 7 wherein said pressure-sensitive adhesive layer is a cured product of a silicone pressure-sensitive adhesive composition comprising (G) 30 to 70 parts by weight of an organopolysiloxane having the average compositional formula (5):

$$R_w^5 SiO_{(4-w)/2} \tag{5}$$

wherein $R^5$ is independently a substituted or unsubstituted $C_1$-$C_{10}$ monovalent hydrocarbon group free of aliphatic unsaturation or a $C_2$-$C_{10}$ alkenyl-containing organic group, and w is a positive number of 1.8 to 2.2, the organopolysiloxane having at least two alkenyl-containing organic groups per molecule, and containing 0.0007 to 0.05 mole per 100 g of alkenyl groups, (H) 70 to 30 parts by weight of an organopolysiloxane containing $R_3^6 SiO_{1/2}$ units and $SiO_{4/2}$ units in a molar ratio of from 0.5/1 to 1/1, wherein $R^6$ is independently a $C_1$-$C_{10}$ monovalent hydrocarbon group free of aliphatic unsaturation or a $C_2$-$C_6$ alkenyl group, the total of components (G) and (H) being 100 parts by weight, (I) an organohydrogenpolysiloxane having the average compositional formula (7):

$$R_y^7 H_z SiO_{(4-y-z)/2} \tag{7}$$

wherein $R^7$ is independently a substituted or unsubstituted $C_1$-$C_{10}$ monovalent hydrocarbon group, y and z are positive numbers meeting y >0, z >0, and 0 <y+z≤3, and containing at least three Si—H groups per molecule, in such an amount as to give 0.2 to 20 moles of Si—H groups per mole of total alkenyl groups in components (G) and (H), (J) a platinum group metal base catalyst for promoting hydrosilylation between alkenyl groups in components (G) and (H) and Si—H groups in component (I) for curing, in such an amount as to give 1 to 500 ppm of the metal based on the total weight of components (G) to (I), and (K) 0.01 to 5 parts by weight of a reaction regulator relative to the total weight of components (G) and (H).

9. The laminate of claim 7 or 8 wherein the substrate of the release liner is a plastic film.

10. A method for preparing the laminate of claim 7, comprising the steps of
furnishing the second release liner treated with the release agent composition (II) for silicone pressure-sensitive adhesives,
applying the silicone pressure-sensitive adhesive composition onto the treated surface of the release liner,
curing the composition to form a pressure-sensitive adhesive layer, and
attaching the first release liner treated with the release agent composition (I) for silicone pressure-sensitive adhesives to the pressure-sensitive adhesive layer.

11. A method for using a substrate-free pressure-sensitive adhesive sheet, comprising the steps of peeling the first release liner from the laminate of claim 7, attaching one surface of the pressure-sensitive adhesive layer to an object, peeling the second release liner therefrom, attaching the opposite surface of the pressure-sensitive adhesive layer to another object.

12. An article comprising the substrate-free pressure-sensitive adhesive sheet obtained from the use method of claim 11.

* * * * *